United States Patent
Akura et al.

(10) Patent No.: US 8,821,166 B2
(45) Date of Patent: Sep. 2, 2014

(54) ARTIFICIAL LENS FOR CATARACT SURGERY PRACTICE

(75) Inventors: Junsuke Akura, Higashimuro-gun (JP); Kiran Pokharel, Nishinomiya (JP)

(73) Assignee: Frontier Vision Co., Ltd., Nishinomiya-shi (JP)

( * ) Notice: Subject to any disclaimer, the term of this patent is extended or adjusted under 35 U.S.C. 154(b) by 0 days.

(21) Appl. No.: 13/640,279

(22) PCT Filed: Apr. 9, 2010

(86) PCT No.: PCT/JP2010/002630
§ 371 (c)(1),
(2), (4) Date: Oct. 9, 2012

(87) PCT Pub. No.: WO2011/125136
PCT Pub. Date: Oct. 13, 2011

(65) Prior Publication Data
US 2013/0030524 A1    Jan. 31, 2013

(51) Int. Cl.
*A61F 2/16* (2006.01)
*A61F 2/00* (2006.01)
*G09B 23/28* (2006.01)
*G09B 23/34* (2006.01)

(52) U.S. Cl.
CPC ............. *G09B 23/28* (2013.01); *G09B 23/34* (2013.01)
USPC .......... 434/271; 623/4.1; 623/6.13; 623/6.59; 424/427

(58) Field of Classification Search
USPC ................ 434/271; 623/4.1, 6.11, 6.12, 6.56, 623/6.59, 6.13; 424/427
See application file for complete search history.

(56) References Cited

U.S. PATENT DOCUMENTS

| | | | |
|---|---|---|---|
| 4,253,199 A | * | 3/1981 | Banko .......................... 623/6.13 |
| 4,762,495 A | | 8/1988 | Maloney et al. |

(Continued)

FOREIGN PATENT DOCUMENTS

| | | |
|---|---|---|
| JP | 2-502224 B2 | 7/1990 |
| JP | 2002-236443 A | 8/2002 |

(Continued)

OTHER PUBLICATIONS

Notification of Transmittal of Translation of the International Preliminary Report on Patentability (PCT/IB/338) and International Preliminary Report on Patentability (PCT/IB/373), issued in PCT Application No. PCT/JP2010/002630, (Nov. 6, 2012).

(Continued)

*Primary Examiner* — Paul Prebilic
(74) *Attorney, Agent, or Firm* — Venable LLP; Michael A. Sartori; Trent Ostler

(57) ABSTRACT

An object is to provide an artificial lens for use in an artificial eye device for cataract surgery practice. The artificial lens includes an artificial nucleus corresponding to a human eye lens nucleus and an artificial cortex corresponding to a human eye lens cortex. The artificial nucleus is formed of an agar gel of agar concentration 1.0 wt % to 5.0 wt %. The artificial cortex is formed of an agar gel of agar concentration 0.5 wt % to 1.5 wt % which is lower than the agar concentration of an agar gel forming the artificial nucleus. In another embodiment, an artificial lens includes an artificial nucleus corresponding to a human eye lens nucleus and an artificial cortex corresponding to a human eye lens cortex. The artificial nucleus is formed of cheese or a cheese-like substance, and the artificial cortex is formed of pulp fiber.

28 Claims, 17 Drawing Sheets

(56) References Cited

U.S. PATENT DOCUMENTS

| | | | |
|---|---|---|---|
| 4,762,496 A | | 8/1988 | Maloney et al. |
| 4,865,551 A | | 9/1989 | Maloney et al. |
| 4,865,552 A | | 9/1989 | Maloney et al. |
| 5,147,861 A | * | 9/1992 | della Valle et al. .............. 514/54 |
| 5,213,579 A | * | 5/1993 | Yamada et al. .............. 623/6.13 |
| 6,589,057 B1 | | 7/2003 | Keenan et al. |
| 6,645,715 B1 | * | 11/2003 | Griffith et al. .................. 435/1.1 |
| 7,709,462 B2 | * | 5/2010 | Bardonnet et al. .............. 514/54 |
| 2003/0004569 A1 | * | 1/2003 | Haefliger ...................... 623/6.34 |
| 2006/0105309 A1 | | 5/2006 | Stoll et al. |
| 2007/0100445 A1 | * | 5/2007 | Shadduck .................... 623/6.37 |
| 2008/0319547 A1 | * | 12/2008 | Draenert .................... 623/16.11 |
| 2009/0004637 A1 | * | 1/2009 | Carda et al. .................... 434/271 |

FOREIGN PATENT DOCUMENTS

| | | |
|---|---|---|
| JP | 2005-128138 A | 5/2005 |
| WO | WO-88/06329 A1 | 8/1988 |

OTHER PUBLICATIONS

English-language translation of the Written Opinion of the International Searching Authority (PCT/ISA/237), issued in PCT Application No. PCT/JP2010/002630, (Jun. 29, 2010).

* cited by examiner

ARTIFICIAL LENS FOR CATARACT SURGERY PRACTICE

TECHNICAL FIELD

The present invention relates to an artificial lens for use in an artificial eye device for cataract surgery practice.

BACKGROUND ART

Cataract is a disease in which a crystalline lens in the eye functioning as a lens becomes opaque. The opacity prevents sufficient light from entering the eye, resulting in visual impairment. The crystalline lens in the human eye is a transparent convex lens of diameter about 9 mm and thickness about 4 to 5 mm and is positioned behind the iris. The crystalline lens is configured such that a tissue corresponding to the content of the lens and being called a cortex is wrapped with the anterior lens capsule and the posterior lens capsule, each of which is about 10 µm in thickness. The cortex is a soft tissue, but a hard opaque tissue called a nucleus is formed in a central portion of the crystalline lens mainly due to aging. This is the leading cause of cataract. The cataract surgery extracts such an opaque crystalline lens to enable sufficient light to enter the eye, thus recovering vision.

Various techniques for such cataract surgery have been developed such as intercapsular cataract extraction (ICCE) and extracapsular cataract extraction (ECCE). Among these techniques, phacoemulsification is now mainly used because this technique involves a reduced incision size, easy postoperative recovery, and a low incidence of astigmatism. The phacoemulsification includes inserting a surgical instrument through an incision of about 1 to 3 mm formed in the cornea or sclera and manipulating the surgical instrument. This surgery includes using a cystotome needle or forceps to tear the anterior lens capsule that is transparent, has a thickness of about 10 µm, and wraps the crystalline lens to make a continuous circular incision with no gap in a radial direction (this is called continuous circular capsulorrhexis (CCC)) and sucking and removing the content of the opaque crystalline lens through the incision. At this time, the lens nucleus, which is a hard portion formed in the center of the crystalline lens, is grooved and split into small fragments based on various techniques. The respective nuclear fragments are fractured with an ultrasound emulsion instrument and the fractured fragments are aspirated and removed (this is called phacoemulsification). Finally, the opaque cortex between the anterior lens capsule and posterior lens capsule is aspirated and removed so as to leave only a transparent capsular bag formed of the anterior capsule and posterior capsule of the lens. Then, an intra ocular lens (IOL) serving as an artificial lens is inserted through the above-described incision and CCC. Such surgery is performed on at least one million people per year in Japan and on at least three million people per year in the United States.

The ultrasound cataract surgery (phacoemulsification) is a delicate surgery requiring delicate techniques, and surgeons need to deal with a relatively large number of cases in order to improve the skill. However, at present, due to frequent medical lawsuits and a strict requirement to obtain informed consent from patients, training young unskilled surgeons in surgery through clinical practice is difficult. Thus, wet lab surgical training using fresh extracted porcine eyes is most frequently used as training for the cataract surgery. However, the porcine eyes are disadvantageous for the following reasons: the porcine eyes become spoiled easily and thus need to be used early after extraction, the use of the porcine eyes in an operating room is unsanitary, preparing and cleaning up the porcine eyes is cumbersome, and relevant surgical consumables are expensive. In particular, the biggest problem of the porcine eye training is that the anterior lens capsule in the porcine eye is excessively soft and unsuitable for CCC training and that the crystalline lens in the porcine eye includes no nucleus and is formed only of a soft cortex, precluding a lens nucleus splitting technique from being practiced. Thus, there have been several proposals for allowing simulation training of the cataract surgery to be carried out so as to cause a feeling close to that which is generated in the case of the human eyes.

Eye devices developed for cataract surgery practice and using an artificial lens include "Marty the Surgical Simulator" (hereinafter referred to as "Marty artificial eye", "Phaco Practice Eyes", "Phak-I™ Surgical Practice Eye" (hereinafter referred to as "Phak I"), and "KITARO DryLab". Among these eye devices, the "Marty artificial eye" and the "KITARO DryLab" include a replaceable artificial lens portion so that after every surgery practice, only the artificial lens portion is replaced. On the other hand, in the "Phaco Practice Eyes" and the "Phak-I", an artificial eye device includes a non-replaceable artificial lens portion in an artificial eyeball portion so that after every surgery practice, the whole artificial eyeball portion is replaced.

The "Marty artificial eye" includes an eyeball (orb) that has a chamber formed inside and an opening through which the chamber communicates with the exterior (see Patent Literatures 1 to 4). The opening includes a shelf that accommodates an artificial posterior lens capsule that protrudes toward the chamber, an artificial lens wrapped, at the front and rear thereof, with a thick film serving as an artificial anterior capsule, and a cornea cap in order. In the "Marty artificial eye", the artificial lens capsule wrapping the artificial lens is formed of a thick film made of vinyl or vinylidene chloride. The excessively hard and thick material of the film substantially precludes the execution of above-described continuous circular capsulorhexis (CCC), which is an essential step for the currently mainstream ultrasonic cataract surgery. Moreover, a hard artificial nucleus is located immediately below the film, and no soft material acting as the cortex exists between the film and nucleus. Thus, disadvantageously, the device has no space to bury an instrument for the CCC such as a cystotome needle or an anterior lens capsule forceps into the lens cortex. The instrument may come into direct contact with the hard nucleus and may be caught thereon. Another reason for the failure to carry out the CCC is that the artificial anterior capsule of the film is fixed so as to be wrinkled and is not tightened at an appropriate tension. The artificial nucleus that is split into fragments which are then ultrasonically fractured is formed of a substance prepared by using gelatin as a main component and adding alginic acid, guar gum, glycol, and gelactasol to the galatin. Thus, the artificial nucleus is difficult to split smoothly and is likely to be collapsed during manipulation. Hence, this surgery is very different from the actual human eye cataract surgery. Additionally, the "Marty artificial eye" itself is a very expensive product, and an artificial cornea and an artificial lens, which are disposable components, are also expensive. Consequently, the "Marty artificial eye" was used only in some facilities, and the manufacturing and supply of this product have been suspended. The greatest cause for the unpopularity of the "Marty artificial eye", intended for the cataract surgery practice, is that this product fails to allow the surgery to be simulated so as to cause a feeling similar to that which is generated in the case of the human eyes.

In the "Phaco Practice Eyes" (Madhu Instruments, New Delhi, India), an artificial anterior capsule wrapping an artificial lens is formed of a synthetic resin film which appears to be vinyl and is relatively thicker and harder than the human eye lens capsule. With the "Phaco Practice Eyes", the CCC can be practiced, but a slight variation in force causes an incision to shift in an unintended direction. Thus, this CCC is very different from the CCC carried out on the human eyes. There is another reason that the "Phaco Practice Eye" fails to allow the CCC to be carried out in exactly the same manner as that for the human eyes. That is, a hard artificial nucleus is located immediately below an artificial anterior capsule, and there is no soft that corresponds to the cortex between the artificial anterior capsule and the nucleus. Thus, the device has no space to bury a cystotome needle or a forceps for the CCC into the cortex. The instrument may come into direct contact with the nucleus and may be caught thereon. Additionally, an artificial nucleus that is split into fragments which are then emulsified and aspirated by a surgery device is made of glycerin soap. Thus, the artificial nucleus can be split using an instrument, but when the artificial nucleus is split, there is a strong sense of resistance from the artificial nucleus similar to that which is generated when hard chocolate is broken. The artificial nucleus is broken with a snap, and the resulting split surface is jagged. The artificial nucleus fails to be split with a certain resilience so that the resulting fragments have smooth cross sections as in the case of the human eyes lens. Moreover, it takes long for the ultrasonic surgery device to emulsify and aspirate the fragments of the nucleus, and also in this point, the surgical simulation with the "Phaco Practice Eyes" is different from actual human eye surgery.

In the "Phak I" (EYE CARE AND CURE TUCSON, Ariz., USA) (patent pending), an artificial anterior capsule is formed of a very thick and soft and brittle material and is thus almost impossible to make an incision of the CCC. Furthermore, an artificial nucleus is present immediately below the artificial anterior capsule, and there is no portion forming an artificial cortex below the anterior lens capsule. The artificial nucleus is formed of a very brittle and soft material and is thus difficult to split into fragments. This precludes the ultrasonic cataract surgery from being effectively practiced.

The "KITARO DryLab" (Frontier Vision Co., Ltd., Nishinomiya, Japan) (an application for a patent was filed in Jan., 2009) is an artificial eye device for practicing cataract surgery which has been developed by Akura, who is the inventor of this "Artificial lens for cataract surgery practice." The device is not intended to allow practice to be carried out using an actual ultrasonic operating deice but is of a type with which practice is carried out on a desk with naked eyes. The "KITARO DryLab" uses an artificial lens formed of an artificial anterior capsule (anterior capsule film), an artificial posterior lens capsule (posterior capsule cup member), an artificial nucleus accommodated in the posterior capsule cup member, and an artificial cortex arranged below the anterior capsule film. The artificial anterior capsule is formed by coating a polyethylene terephthalate (PET) film of thickness 5 µm with a special resin dye. The artificial anterior capsule has a thickness and a tear strength against instruments which are approximate to those of the human anterior lens capsule. An artificial cortex made of soft wheat clay is present below the PET film. When the CCC is carried out, an instrument used is buried in the artificial cortex so that the CCC can be practiced exactly in the same manner as that for the human eyes. However, one artificial nucleus is made of plastics and intended for the practice of manual instrument manipulation. This plastic nucleus cannot be emulsified or aspirated using the ultrasonic surgery device. Another nucleus is made of polymer clay and can thus be split and emulsified and aspirated using the ultrasonic surgery device. However, during the emulsification and aspiration, the polymer clay is always caught in an aspiration line of the surgery device, often suspending the surgery practice for an operation for removing the caught polymer clay. The wheat clay serving as the artificial cortex is also caught in the aspiration line. Thus, it is difficult to practice the surgery based on the ultrasonic cataract surgery device using the artificial lens currently used in the "KITARO DryLab".

Akura, the inventor, presented a method for practicing the ultrasonic cataract surgery using the "KITARO DryLab" at German Society of Ophthalmology Congress (DOC) in September 2009 (Nuremberg) and at European Society of Cataract & Refractive Surgeons (ESCRS) (Barcelona) in October 2009; the title of the presentation was "KITARO DryLab & WetLab-Handy Surgical Simulate for Practicing Cataract Surgery". In the presentation, Akura introduced "KITARO WetLab" in which an opening in an upper part of an artificial eyeball portion of the "KITARO DryLab" is closed with a commercially available polypropylene tape so that the resulting "KITARO DryLab is used to practice the surgery based on the ultrasonic cataract surgery device. An artificial nucleus in the "KITARO WetLab" is produced by, when the surgery is practiced, boiling agar together with water on site to prepare an agar solution, and using a syringe to aspirate and inject the agar solution into a plastic cup. An artificial cortex in an artificial lens in the "KITARO WetLab" is made of starch paste. An artificial anterior capsule is made of a PET film of thickness 5 µm, and an artificial posterior lens capsule is made of hard plastics with a given shape. Since the artificial lens used in the "KITARO WetLab" includes the artificial anterior capsule, the artificial cortex, and the artificial nucleus, the "KITARO WetLab" allows simulation training to be achieved which is much more similar to the human eye surgery than the other artificial eye devices for surgery practice. However, the artificial cortex made of starch paste is easily aspirated by the surgery device together with the artificial nucleus when the artificial nucleus is emulsified and aspirated. This precludes the artificial nucleus from being held in a central portion of the artificial lens throughout the emulsification and aspiration operation. Thus, the artificial nucleus migrates freely to prevent effective surgery practice. Furthermore, the "KITARO WetLab" has another disadvantage regarding hydrodissection that is always carried out before a phacoemulsification operation on the nucleus. The hydrodissection is an operation of injecting water into the artificial lens to separate the nucleus portion, the cortex portion, and the lens capsule portion from one another. When the hydrodissection is carried out on the artificial cataract lens with the artificial cortex made of starch paste, the starch paste splashes into a flow of water, and most of the starch paste is lost before the nucleus is emulsified and aspirated. Moreover, the human eye lens cortex has fibrous nature, and the cortex made of starch paste fails to express the nature. This also precludes effective surgery practice.

CITATION LIST

Patent Literature

PTL 1: U.S. Pat. No. 4,762,495
PTL 2: U.S. Pat. No. 4,762,496
PTL 3: U.S. Pat. No. 4,865,551
PTL 4: U.S. Pat. No. 4,865,552
PTL 5: U.S. Pat. No. 6,589,057

SUMMARY OF INVENTION

Technical Problem

Cataract surgery is carried out by a combination of many steps. Among these steps, the following are important: 1. a continuous circular capsulorhexis (CCC) step, 2. a hydrodissection step of separating the lens capsule from the lens nucleus or the lens cortex, 3. a step of grooving and splitting the lens nucleus into fragments, 4. a step of emulsifying and aspirating the fragments of the lens nucleus, and 5. a step of aspirating the opaque lens cortex. An artificial lens for cataract surgery practice has been demanded which allows the above-described steps to be practiced so as to cause a feeling close to that which is generated in the case of the human eye surgery.

Several examples of artificial lenses for surgery practice have been reported, including those which are related to the above-described artificial eye device. However, the previously reported artificial lenses fail to allow simulation training for the cataract surgery procedure to be carried out so as to cause a feeling similar to that which is generated in the case of the human eyes.

In particular, artificial nuclei in the previously reported artificial lenses are disadvantageous as described below. When the hardness of the nucleus is set to a large value in order to simulate the human eye lens, which has a medium to high hardness, the nucleus precludes the grooving and splitting step from being carried out as in the case of the human eyes lens nucleus. Even if reaction approximate to that of the human eye is exhibited during the step of grooving and splitting step, the nucleus emulsifying and aspirating step may disadvantageously involve blockage or require an extremely long time.

Furthermore, the previously reported artificial lenses include no artificial cortex, or even when including an artificial cortex, fail to meet the following requirements: the artificial cortex can hold the artificial nucleus at a predetermined position during the hydrodissection step and the grooving and splitting step, can avoid being aspirated together with the fragments of the artificial nucleus during the nucleus emulsifying and aspirating step, and can be aspirated without problem during the subsequent cortex aspirating and removing step.

An object of the present invention is to solve the problems of the conventional artificial lens for cataract surgery practice and provides an artificial lens for cataract surgery practice which allows the steps of the cataract surgery procedure to be individually or continuously practiced so as to cause a feeling close to that which is generated in the case of the human eyes; the steps include the continuous circular capsulorhexis (CCC) step, the hydrodissection step of separating the lens nucleus or the lens cortex from the lens capsule, the step of grooving and splitting the lens nucleus into fragments, the step of emulsifying and aspirating the fragments of the lens nucleus, and the step of aspirating and removing the opaque lens cortex.

Solution to Problem

An artificial lens according to a first embodiment of the present invention which is intended to achieve the above-described object is characterized by including an artificial nucleus corresponding to a human eye lens nucleus and an artificial cortex corresponding to a human eye lens cortex, and in that the artificial nucleus is formed of an agar gel of agar concentration 1.0 wt % to 5.0 wt %, and the artificial cortex is formed of an agar gel of agar concentration 0.5 wt % to 1.5 wt % which is lower than the agar concentration of an agar gel forming the artificial nucleus.

In the artificial lens according to the first embodiment of the present invention, an artificial nucleus made of an agar gel of agar concentration 1.0 wt % to 5.0 wt % offers not only reaction to a nucleus grooving and splitting step but also reaction to an emulsifying and aspirating step which reactions are approximate to those of the human eye lens nucleus. Furthermore, an artificial cortex made of an agar gel of agar concentration 0.5 wt % to 1.5 wt % which is lower than the agar concentration of an agar gel forming the artificial nucleus can suitably hold the artificial nucleus at a predetermined position during a hydrodissection step and the nucleus grooving and splitting step. The artificial cortex can avoid being aspirated together with the fragments of the artificial nucleus and can be aspirated without any problem during the subsequent cortex aspirating and removing step.

In the first embodiment, the artificial nucleus is preferably 1.0 wt % to 3.0 wt % and more preferably 1.0 wt % to 2.0 wt % in agar concentration. Furthermore, the artificial nucleus preferably has a grade 1 to 2 nucleus hardness according to an Emery classification of the nucleus hardness. This enables a surgery of a human eye lens with a softer lens nucleus to be simulated.

To obtain an artificial lens with higher quality, the inventor has examined the method for manufacturing the artificial lens according to the first embodiment to find a new method. This method for manufacturing an artificial lens is characterized by including a step of cooling the artificial nucleus to 0° C. to 10° C., a step of preparing an agar solution to be formed into the artificial cortex and adjusting a temperature of the agar solution to 35° C. to 60° C., a step of immersing the cooled artificial nucleus in the agar solution, and a step of cooling the artificial nucleus and the agar solution to a temperature at which the agar solution is gelled. This enables an artificial lens to be obtained in which the artificial lens nucleus and the artificial lens cortex are prevented from adhering together.

An artificial lens according to a second embodiment of the present invention which is intended to achieve the above-described object is characterized by including an artificial nucleus corresponding to a human eye lens nucleus and an artificial cortex corresponding to a human eye lens cortex and in that the artificial nucleus is formed of cheese or a cheese-like substance and the artificial cortex is formed of pulp fiber.

An artificial nucleus made of the cheese or the cheese-like substance has unprecedented nature similar to the nature of the human eye lens nucleus, which has a medium to high hardness. Furthermore, the artificial cortex formed of the pulp fiber allows the human eye lens to be appropriately simulated in connection with the hydrodissection step and the cortex aspiring and removing step but also allows the artificial nucleus formed of the cheese or the cheese-like substance to be stabilized, which is likely to be changed in quality by the effect of moisture or the like.

Here, to exhibit nature approximate to the nature of the human eye in connection with each step of a cataract surgery, the cheese or the cheese-like substance contains 25 wt % to 50 wt % of water, 10 wt % to 50 wt % of protein, and 10 wt % to 40 wt % of fat based on a total weight. Furthermore, protein contained in the cheese or the cheese-like substance contains casein protein, and a submiscele of the casein protein forms a net-like structure. The artificial lens according to the second embodiment may include an artificial nucleus of a grade 2 to 4 nucleus hardness according to the Emery classification of the nucleus hardness.

The artificial lens according to the second embodiment enables simulation of steps of a cataract surgery of a human eye lens with a hard human eye lens nucleus with a medium to high nucleus hardness.

An artificial lens according to a third embodiment of the present invention which is intended to achieve the above-described object is characterized by further including an artificial posterior capsule film having nature approximate to the nature of a human eye posterior lens capsule and an artificial anterior capsule film having nature approximate to the nature of a human eye anterior lens capsule.

According to this embodiment, not only the advantages of the first and second artificial lenses are obtained but also the artificial anterior capsule film and the artificial posterior capsule film have a tear strength and a resilience similar to the tear strength and resilience of the human eye. Thus, CCC simulation training can be carried out so as to cause a feeling close to that which is generated in the case of the human eyes. Furthermore, intraoperative complications such as posterior capsule rupture and dropping of the nucleus into the vitreous cavity can be experienced.

Here, the artificial anterior capsule film and the artificial posterior capsule film may each be formed of, as a main component, a material selected from a group consisting of agar, polyethylene terephthalate, oriented polypropylene, and cellophane and which are 4 µm to 45 µm, preferably 4 µm to 20 µm in thickness.

Furthermore, the artificial anterior capsule film particularly preferably contains polyethylene terephthalate as a main component and is 4 µm to 20 µm in thickness. This is because this film can demonstrate performance closest to the performance of the human eye anterior lens capsule of general elderly people. Thus, when the artificial anterior capsule film is used which includes polyethylene terephthalate as a main component and which is 4 µm to 20 µm in thickness, CCC simulation can be carried out so as to cause a feeling very close to that which is generated in the case of the human eyes.

A variation of the artificial lens according to this embodiment may further include a support member that supports a lower part of a junction between the artificial anterior capsule film and the artificial posterior capsule film. The support member need not include a bottom portion provided that the support member includes a circular opening in an upper part thereof. The support member may be shaped like, for example, a ring, a bottomed cylinder, or a cup. The support member facilities production of the artificial lens according to the third embodiment of the present invention.

As described above, the artificial lens according to the third embodiment of the present invention allows a series of steps included in the many steps of the cataract surgery to be carried out so as to cause a feeling very close to that which is generated in the case of the human eyes; the series of steps include the CCC step, the hydrodissection step, the step of grooving and splitting the nucleus into fragments, the step of emulsifying and aspirating the fragments of the nucleus, and the step of aspirating and removing the cortex. In addition, the artificial lens allows intraoperative complications such as posterior capsule rupture and dropping of the nucleus into the vitreous cavity to be experienced.

An artificial lens according to a fourth embodiment of the present invention which is intended to achieve the above-described object corresponds to the artificial lens according to the first embodiment or second embodiment characterized by further including an artificial posterior capsule cup member with a shape corresponding to the human eye posterior lens capsule and an artificial anterior capsule film with nature approximate to the nature of the human eye anterior lens capsule.

According to the fourth embodiment, not only the advantages of the first and second artificial lenses are obtained but also the artificial anterior capsule film and the artificial posterior capsule film have a tear strength and a resilience similar to the tear strength and resilience of the human eye. Thus, the CCC simulation training can be carried out so as to cause a feeling very close to that which is generated in the case of the human eyes. Furthermore, the use of the artificial posterior capsule cup member allows the artificial lens to be easily produced, leading to easy mass production.

Here, the artificial anterior capsule film may be formed of, as a main component, a material selected from a group consisting of agar, polyethylene terephthalate, oriented polypropylene, and cellophane and which is 4 µm to 45 µm, preferably 4 µm to 20 µm in thickness.

Furthermore, the artificial anterior capsule film particularly preferably includes polyethylene terephthalate as a main component and is 4 µm to 20 µm in thickness. This is because this film can demonstrate performance closest to the performance of the human eye anterior lens capsule of general elderly people. Thus, when the artificial anterior capsule film is used which includes polyethylene terephthalate as a main component and which is 4 µm to 20 µm in thickness, CCC simulation can be carried out so as to cause a feeling very close to that which is generated in the case of the human eyes.

As described above, the artificial lens according to the fourth embodiment of the present invention allows a series of steps included in the many steps of the cataract surgery to be carried out so as to cause a feeling very close to that which is generated in the case of the human eyes; the series of steps include the CCC step, the hydrodissection step, the step of grooving and splitting the nucleus into fragments, the step of emulsifying and aspirating the fragments of the nucleus, and the step of aspirating and removing the cortex.

An artificial eye device for cataract surgery practice according to a fifth embodiment of the present invention which is intended to achieve the above-described object is characterized by including a lower member with a recess that is open on an upper side thereof on which a circular opening is formed, an upper member removably connected to the lower member and including at least an annular portion, the artificial lens according to the first embodiment or second embodiment of the present invention accommodated in the recess, an artificial anterior capsule film disposed between the lower member and the upper member and formed of a film having nature approximate to the nature of a human eye anterior lens capsule, and tension applying means for applying a tension which is uniform across 360° and approximate to a tension applied to the human eye anterior lens capsule, to the artificial anterior capsule film in contact with the artificial lens.

In the artificial eye device for cataract surgery practice according to the fifth embodiment of the present invention, when the upper member and the lower member are connected together, the tension applying means applies the tension which is uniform across 360° and approximate to the tension applied to the human eye, to the artificial anterior capsule film formed of the film having nature approximate to the nature of the human eye anterior lens capsule, while the artificial anterior capsule film is accommodated in the recess in contact with an artificial cortex with a softness approximate to the softness of the human eye lens cortex. This enables the CCC simulation training to be carried out so as to cause a feeling closer to that which is generated in the case of the human eyes.

Here, the artificial anterior capsule film may be formed of, as a main component, a material selected from a group consisting of agar, polyethylene terephthalate, oriented polypropylene, and cellophane and which is 4 µm to 45 µm, preferably 4 µm to 20 µm in thickness.

Furthermore, the artificial anterior capsule film particularly preferably includes polyethylene terephthalate as a main component and is 4 µm to 20 µm in thickness. This is because this film can demonstrate performance closest to the performance of the human eye anterior lens capsule of general elderly people. Thus, when the artificial anterior capsule film is used which includes polyethylene terephthalate as a main component and which is 4 µm to 20 µm in thickness, CCC simulation can be carried out so as to cause a feeling very close to that which is generated in the case of the human eyes.

An artificial eye device for cataract surgery practice according to a sixth embodiment of the present invention which is intended to achieve the above-described object is characterized by including a lower member with a recess that is open on an upper side thereof on which a circular opening is formed, an upper member removably connected to the lower member and including at least an annular portion, the artificial lens according to any one of claims 10 to 16 accommodated in the recess, and tension applying means for applying a tension which is uniform across 360° and approximate to a tension applied to a human eye anterior lens capsule, to the artificial anterior capsule film.

In the artificial eye device for cataract surgery practice according to the sixth embodiment of the present invention, when the upper member and the lower member are connected together, the tension applying means applies the tension which is uniform across 360° and approximate to the tension applied to the human eye anterior lens capsule, to the artificial anterior capsule film formed of the film having nature approximate to the nature of the human eye anterior lens capsule, while the artificial anterior capsule film is accommodated in the recess. This enables the CCC simulation training to be carried out so as to cause a feeling closer to that which is generated in the case of the human eyes.

Here, the annular portion of the upper member may include at least one hole for instrument insertion formed therein. By inserting, through the at least one hole for instrument insertion, any instrument or device such as a cystotome, an ultrasound handpiece, a nucleus splitting hook, a pre-chopper, or a phaco machine which is used for relevant steps of cataract surgery practice, and repeating surgery practice, the trainee can learn how to appropriately position and manipulate the instrument or device during operation.

An artificial eye device for cataract surgery practice according to a seventh embodiment of the present invention which is intended to achieve the above-described object corresponds to the artificial eye device for cataract surgery practice according to the fifth embodiment or sixth embodiment characterized by further including an artificial cornea or an artificial sclera attached to the annular portion of the upper member and formed of a material having nature approximate to the nature of a human eye cornea or a human eye sclera.

As described above, the cataract surgery device according to the fifth embodiment or sixth embodiment of the present invention allows a series of steps included in the many steps of the cataract surgery to be carried out so as to cause a feeling very close to that which is generated in the case of the human eyes; the series of steps include the continuous circular capsulorhexis (CCC) step, the hydrodissection step of separating the lens capsule from the lens nucleus or the lens cortex, the step of grooving and splitting the lens nucleus into fragments, the step of emulsifying and aspirating the fragments of the lens nucleus, and the step of aspirating and removing the opaque lens cortex. In contrast, the artificial eye device for cataract surgery practice according to the seventh embodiment of the present invention enables the practice of, in addition to the series of cataract surgery steps, a step of incising and suturing the cornea or the sclera which is carried out before or after the series of cataract surgery steps. The seventh embodiment further enables the series of cataract surgery steps so as to cause a feeling closer to that which is generated in the case of the human eyes.

Here, the artificial cornea or the artificial sclera preferably has a dome shape corresponding to the human eye cornea. The seventh embodiment allows the step of incising and suturing the cornea or the sclera to be carried out so as to cause a feeling close to that which is generated in the case of the human eyes.

The nature approximate to the nature of the human eye cornea or the human eye sclera includes nature concerning the incising and suturing step such as resilience, resistance, softness, and thickness. A material with nature approximate to the nature of the human eye cornea or the human eye sclera may be selected from a group consisting of thermoplastic rubber, a silicon resin, a soft vinyl chloride resin, a hydro gel, and a soft acrylic resin. These materials are preferably transparent and/or white like the human eye cornea or the human eye sclera. One artificial cornea or one artificial sclera may be provided such that a portion thereof which corresponds to the human eye artificial cornea is transparent, whereas a portion thereof which corresponds to the human eye sclera is white.

An artificial eye device for cataract surgery practice according to an eighth embodiment of the present invention which is intended to achieve the above-described object corresponds to the artificial eye device for cataract surgery practice according to any of the fifth embodiment to seventh embodiment of the present invention characterized by further including a magnet incorporated in the lower member so that a direction of a line of magnetic force substantially aligns with a direction of a line of sight and a magnetic substance fixed to a pedestal and in which at least a surface that comes into abutting contact with the magnet is formed into a protruding curved surface.

In the artificial eye device for cataract surgery practice according to the eighth embodiment of the present invention, the magnet incorporated in the lower member attracts the magnetic substance fixed to the pedestal by means of a magnetic force. At this time, since the magnet is incorporated in the lower member so that the line of the magnetic force of the magnet substantially aligns with the direction of the line of sight, the direction of the artificial eye formed of the lower member and the upper member connected to the lower member always lies opposite the center of curvature of the curved surface of the magnetic substance. When an external force is applied to the artificial eye, the artificial eye moves so as to slide over the curved surface of the magnetic substance so that the center of curvature of the curved surface of the magnetic substance serves as a guiding center. The artificial eye can be oriented in any direction within the range of rotation regulated by the amount by which the upper portion of the magnetic substance is exposed from the pedestal and the magnitude of the radius of curvature, and is fixed so as to face in the direction. Thus, the use of the artificial eye device for cataract surgery practice according to the eighth embodiment is helpful for learning, for example, how the human eye rotates in conjunction with manipulation of an instrument and how to manipulate an instrument so as to prevent the eyeball from being rotated in an inappropriate direction. The magnet is preferably incorporated in the lower member so that a point contact position between the magnet and the curved surface of the magnetic substance corresponds to the center of the human eye so as to allow the behavior of the human eye during operation to be simulated.

Advantageous Effects of Invention

The present invention can provide an artificial lens including an artificial nucleus having a hardness (softness) approximate to the hardness of the human eye lens nucleus and showing easiness of being split and being emulsified and aspirated by an aspiration device for cataract surgery approximate to the easiness of the human eye lens nucleus, and an artificial cortex having a hardness (softness) approximate to the hardness of the human eye lens cortex and showing easiness of being aspirated by the aspiration device for cataract surgery approximate to the easiness of the human eye lens cortex. The artificial cortex according to the present invention includes the artificial nucleus therein, and can hold the non-aspirated artificial nucleus at a predetermined position, preferably in a central portion of the artificial cortex, throughout the operation of emulsifying and aspirating the artificial nucleus by the aspiration device for cataract surgery. Thus, in the cataract surgery practice, the surgery steps performed by the ultrasonic cataract surgery device can be simulated so as to cause a feeling very similar to that which is generated in the case of the human eyes; the steps include the nucleus splitting step, the nucleus emulsifying and aspirating step, and the cortex aspirating step. The artificial lens further includes an artificial anterior capsule with a thickness and a tear strength approximate to the thickness and tear strength of the human eye anterior lens capsule. This allows the continuous circular capsulorhexis (CCC) to be simulated so as to cause a feeling very similar to that which is generated in the case of the human eye surgery. The artificial lens further includes an artificial posterior capsule with a shape and a softness approximate to the shape and softness of the human eye posterior lens capsule. This allows intraoperative complications such as posterior capsule rupture and dropping of the nucleus into the vitreous cavity to occur during the cataract surgery practice, thus helping to achieve more effective learning.

The artificial lens according to the present invention can be replaceably installed in an artificial eyeball portion of the artificial eye device for cataract surgery practice. The present invention enables the surgery steps to be simulated so as to cause a feeling very similar to that which is generated in the case of the human eye surgery; the surgery steps include the continuous circular capsulorhexis (CCC) step, the hydrodissection step of separating the lens capsule from the lens nucleus, and the nucleus grooving and splitting step, the nucleus emulsifying and aspirating step, and the cortex aspirating step carried out by the ultrasonic cataract surgery device.

DESCRIPTION OF EMBODIMENTS

There has been a demand for an artificial lens provided in an artificial eye device for cataract surgery and which allows surgery simulation training to be carried out exactly in the same manner as that for the human eyes lens. During past three years, the inventor spent at least 3,000 hours in experiments to test and process various materials and combinations thereof. Then, at last, the inventor successfully developed an artificial lens (artificial cataract lens) that allows surgery simulation training to be carried out exactly in the same manner as that for the human eyes lens.

I. Structure and Material of the Artificial Lens According to the Present Invention An embodiment of the artificial lens according to the present invention includes at least an artificial nucleus corresponding to the human eye nucleus and an artificial cortex corresponding to the human eye lens cortex. Another embodiment of the artificial lens according to the present invention further includes an artificial anterior capsule and an artificial posterior capsule both corresponding to the human eye lens capsule. Various embodiments of the artificial lens according to the present invention will be described with reference to FIG. 1 to FIG. 3.

Figure 1:
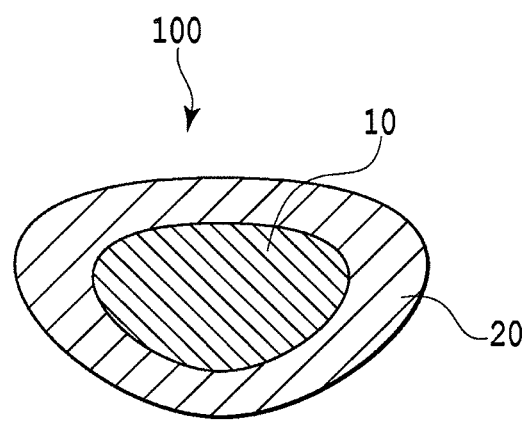
FIG. 1 is a cross-sectional view showing an artificial lens according to a first embodiment and a second embodiment of the present invention.

FIG. 1 is a cross-sectional view showing a first embodiment and a second embodiment of the artificial lens according to the present invention. The artificial nucleus corresponding to the human eye lens nucleus is shown by 10. The artificial cortex corresponding to the human eye cortex is shown by 20. The artificial nucleus 10 is located in the artificial cortex 20. An artificial lens 100 according to the first embodiment of the present invention is formed of the artificial nucleus 10 made of an agar gel with a particular agar concentration and the artificial cortex 20 made of an agar gel with a particular agar concentration. Furthermore, the artificial lens according to the second embodiment of the present invention is formed of the artificial nucleus 10 made of cheese or a cheese-like substance and the artificial cortex 20 made of pulp fiber. Selection and combination of these materials will be described below.

I-1. Artificial Nucleus 10

The inventor first examined a material for the artificial nucleus which can be used for the artificial lens according to the present invention.

To allow surgery simulation training to be carried out in a manner similar to that in the case of the human eye lens, the artificial nucleus needs to be split with a certain resilience using a surgery instrument so that the resulting fragments have smooth cross sections and can be smoothly emulsified and aspirated by an ultrasonic surgery device. Furthermore, more ideally, the artificial nucleus needs to have a hardness varying depending on the progress of cataract and ranging from a low hardness to a high hardness.

Some of the materials used for experiments for development of the artificial nucleus are listed below.

<Synthetic substance material> Silicon rubber, paraffin, polyvinyl chloride (+softener), a high water-absorption resin, inlay wax for dental technicians, polymer clay, methyl cellulose, carton N, hydroxyl apatite, dibenzylidene sorbitol, apricot aldehyde, dibenzylidene xylitol, sodium alginate, and tetramethyl-1, 3-cyclobutanediol.

<Animal materials> Gelatin, pectin, egg white, fish cakes, non-fat dry milk, butter, hard natural cheeses such as mimolette, red cheddar, emmental, parmigiano, oranundbetsu, edam, scottish, cheddar mild, ondeko, old deutch master, petit agour, puremiteiam, tete de moine, comte AOC extra, petit mimole, comte, gruyere, sales back, baby bel, beaufort, tanhau, uee, raschera, and animal soaps.

<Plant materials (boiled or heated)> Soybean, azuki bean, lentil, red kidney bean, garbanzo, pea, sweet chestnut, potato, lotus, ginkgo nut, oil treatment reagent (+sesame oil, salad oil, olive oil, horse oil cream, or soap), agar, kappa-carrageenan, flour, rice flour, corn starch, sweet bean jelly, uiro, chocolates, cocoa powder, wheat clay, paper clay, and plant soaps.

<Mixed substance> Formalin, glass bead of diameter 2 μm to 50 μm, bamboo fiber, pulp fiber, calcium chloride, precipitated calcium carbonate, fired shell calcium, guar gum, gum arabic, methyl cellulose, ethyl cellulose, sodium hyaluronate, and glycerin.

Among the tried materials, an agar gel of a certain agar concentration and a hard natural cheese from a certain brand exhibited performance appropriate for the artificial nucleus.

(1) Artificial nucleus made of an agar gel

Artificial nuclei were produced using agar gels with various agar concentrations. The artificial nucleus made of the agar gel can be produced by heating and stirring powder agar in water at 90° C. to 100° C. for five minutes and then cooling and shaping the solution. An agar gel with an agar concentration of higher than 5 wt % offered a sufficient hardness but failed to provide an artificial nucleus that allows the human eye surgery to be appropriately simulated. That is, an artificial nucleus made of an agar gel with an agar concentration of higher than 5 wt % was difficult to groove and split, and emulsifying and aspirating the agar gel required a very long time. Thus, the agar gel failed to demonstrate performance approximate to that of the human eye lens nucleus. On the other hand, in connection with the nucleus grooving and splitting step and the emulsifying and aspirating step, an agar gel with an agar concentration of 1 wt % to 5 wt %, preferably 1 wt % to 3 wt %, and more preferably 1 wt % to 2 wt % demonstrated performance approximate to that of the human eye lens nucleus. The artificial nucleus made of the agar gel appropriately simulated a relatively soft human eye lens nucleus of a grade 1 to 2 hardness according to the Emery classification of the nucleus hardness. According to the Emery classification of the nucleus hardness, the hardness is measured based on a color determined by visually observing a target using a slit lamp biomicroscope, and increases with the density of the color, ranging from transparency (0 degree) through yellow and brown to black (5 degrees).

(2) Artificial Nnucleus Made of Cheese or a Cheese-like Substance

Among the hard cheeses used for the experiments, the mimolette cheese (France) and the oranunbetsu cheese (Hokkaido, Japan) formed into artificial nuclei demonstrated the best performance. In connection with the nucleus grooving and splitting step and the emulsifying and aspirating step, the mimolette cheese and the oranunbetsu cheese forming artificial nuclei with a high hardness and a medium hardness, respectively, demonstrated performance approximate to that of the human eye lens nucleus. On the other hand, these hard cheeses are natural and thus have unstable quality. These cheeses have nature varying depending on maturity, temperature, humidity, and the like, and are modified over time. If an artificial nucleus is formed from any of these cheeses, the artificial nucleus needs to be made and used in a short time after the beginning of formation of the artificial nucleus in order to allow effects predicted from the original nature of the cheese to be achieved.

Thus, the inventor examined how to form a cheese material into an artificial nucleus which demonstrates performance approximate to that of the human eye lens nucleus in connection with the nucleus grooving and splitting step and the emulsifying and aspirating step and which maintains stable quality for a long time.

First, in a first method, natural cheese was processed. That is, grated natural cheese was placed into water with molten salt dissolved therein. The solution was then stirred under heat so as to homogeneously dissolve the cheese. The solution was then cooled slowly and dried to adjust the moisture content thereof. Thus, processed cheese was obtained. By way of example, 0.08 pts. wt. of sodium diphosphate serving as molten salt was added to 0.4 pts. wt. of water and dissolved. Then, 1.6 pts. wt. of natural cheese grated with a cheese grator was added to the solution and stirred under heat at 80° C. to 90° C. At the final stage of the heating, to further improve quality, sorbic acid dissolved in ethanol, serving as a preservative, was added to the solution so that the weight of the sorbic acid was 0.3 g, whereas the total weight of the cheese was 100 g.

Then, the solution was cooled slowly in a styrofoam container all night and all day to obtain processed cheese. For example, when red cheddar cheese was used as a material, the resulting processed cheese contains 44.2 wt % of moisture, 19.5 wt % of protein, and 27.9 wt % of fat based on the total weight of the processed cheese. Then, by way of example, the resulting cheese was cut into plate-like fragments each of thickness 3 mm, and each fragment was punched with a circular punch of diameter 8 mm. The corners of the piece were cut off with a knife to shape the piece into an artificial nucleus shaped substantially like a convex lens. Thus, an artificial nucleus 10 equivalent to a grade 3 nucleus hardness according to the Emery classification of the nucleus hardness was successfully produced. When the hard natural cheese was used as a material, hard processed cheese tended to be obtained. However, the hardness of the processed cheese was successfully adjusted by regulating the water content by increasing or reducing the amount of water for manufacturing or varying a drying condition. To obtain a hard artificial nucleus, the amount of water added is preferably set to the minimum required value. For example, 2% to 3% of water may be added with respect to the total weight of the natural cheese. The amount of water added may be zero. The molten salt may be phosphoric salt, citric salt, or a combination thereof and citrate sodium is preferably used. Furthermore, to allow the quality of the cheese to be kept stable for a longer time, a preservative maybe optically added. As a preservative, for example, sorbic acid or dehydroacetic acid dissolved in ethanol may be added at the final stage of stirring under heat. However, the preservative that may be added and the time of the addition are not limited to this aspect. Additionally, the processed cheese according to the present invention can be produced by using a method common in the technical field of cheese manufacturing to dissolve one or more types of natural cheese under heat and then cooling and solidifying the dissolved cheese. The above-described process allows the quality of the cheese to be controlled, enabling processed cheese with an intended hardness to be manufactured using various natural cheese materials.

The artificial nucleus thus made of the processed cheese exhibited higher quality stability than artificial nuclei made of natural cheese. Even when the artificial nucleus made of the processed cheese was used after a long interval from the formation, the artificial nucleus demonstrated high performance similar to that exhibited immediately after the formation in connection with the grooving and splitting step and the emulsifying and aspirating step.

The inventor examined the reason why the artificial nucleus made of the cheese demonstrates performance approximate to that of the human eye lens nucleus in connection with the cataract surgery procedure. The "cheese" as used herein includes natural cheese and processed cheese. The cheese contains protein, and a submiscele of casein, a type of protein, forms a net-like structure. On the other hand, the human eye lens nucleus contains insoluble protein arranged in a meridian direction of the lens nucleus and such protein sequences are laminated in a radial direction as in the case of an onion. Although it is not a desire to be bounded by theory, the cheese and the human eye lens nucleus have similar components and structures. This is expected to significantly contribute to allowing the artificial nucleus made of the cheese to demonstrate performance very similar to that of the human eye lens nucleus.

Thus, the inventor paid attention to the casein protein, which serves to provide a structure very similar to the human eye cataract lens nucleus. In a second method for obtaining an artificial nucleus which demonstrates performance approximate to that of the human eye lens nucleus in connection with the grooving and splitting step and the emulsifying and aspirating step, the inventor uses a material derived from casein protein to produce a cheese-like substance.

The "cheese-like substance" as used herein refers to a substance which has components similar to those of cheese and which exhibits nature similar to that of cheese in connection with the grooving and splitting procedure and emulsifying and aspirating procedure of the cataract surgery. The cheese-like substance can be manufactured by for example, stirring caseate, fat and oil, water, and molten salt under heat, cooling the solution slowly, and drying the resultant substance to adjust the moisture content of the substance. The caseate used can be selected from a group consisting of alkali metal caseate (for example, sodium caseate), alkali earth metal caseate, and ammonium caseate. The fat and oil may be, for example, salad oil, palm oil, olive oil, or butter, but is not limited to these. The molten salt may be phosphoric salt, citric salt, or a combination thereof, and citrate sodium is preferably used. Furthermore, to allow the quality of the cheese-like substance to be kept stable for a longer time, a preservative or the like may be optionally added. As a preservative, for example, sorbic acid or dehydroacetic acid dissolved in ethanol may be added at the final stage of stirring under heat. However, the preservative that may be added and the time of the addition are not limited to this aspect.

By way of example, 0.08 pts. wt. of sodium citrate was added to 1 pts. wt. of water and dissolved. Then, 1.2 pts. wt. of casein sodium and 0.4 pts. wt. of fat and oil (salad oil) were added to the solution, with the pH of the solution adjusted to about 5.0 using a pH adjuster. The solution was then stirred under heat at 80° C. to 90° C. To further improve preservation stability, sorbic acid dissolved in ethanol, serving as a preservative, was added to the solution so that the weight of the sorbic acid was 0.3 g, whereas the total weight of the raw material (water, sodium citrate, casein sodium, fat and oil, and a pH adjuster) was 100 g. The resultant substance was cooled to obtain a cheese-like material. At this time, the resulting cheese-like substance contained 37.2 wt % of moisture, 44.6 wt % of protein (casein protein), and 14.9 wt % of fat based on the total weight of the cheese-like substance. The resulting cheese-like substance was cut into plate-like fragments each of thickness 3 mm, and each fragment was punched with a circular punch of diameter 8 mm. The corners of the piece were cut off with a knife to shape the piece into an artificial nucleus shaped substantially like a convex lens. Thus, an artificial nucleus 10 equivalent to a grade 2 nucleus hardness according to the Emery classification of the nucleus hardness was successfully produced.

The hardness of the cheese-like substance was successfully adjusted by regulating the water content by increasing or reducing the amount of water for manufacturing or varying a drying condition. Moreover, during the stirring under heat step, the hardness in the final stage was also successfully increased by adding separately prepared processed cheese.

Then, the inventor examined the components of the cheese and cheese-like substance intended to exert effects corresponding to the object of the present invention. The processed cheese and cheese-like substance used for the artificial nucleus according to the present invention contains 25 wt % to 50 wt % and preferably 35 wt % to 45 wt % of moisture, 10 wt % to 50 wt % and preferably 20 wt % to 40 wt % of protein, and 10 wt % to 40 wt % and preferably 20 wt % to 35 wt % of fat based on the total weight of the process cheese or the cheese-like substance. The total of the three components does not exceed 100 wt %. Furthermore, the 100 wt % may optionally include another component, for example, a preservative or any other stabilizer, or any other substance that may generally be used for cheese.

The above-described component ratio served to provide artificial nuclei made of the process cheese and cheese-like substance and exhibiting a grade 2 to 4 nucleus hardness according to the Emery classification of the nucleus hardness. These artificial nuclei correspond to various hardnesses of the human eye lens nucleus ranging from a medium hardness to a high hardness and thus demonstrate performance approximate to that of the human eye lens nucleus in connection with the grooving and splitting procedure and emulsifying and aspirating procedure of the cataract surgery practice. Furthermore, when used after the artificial nucleus is formed and before the quality is degraded, even the natural cheese can demonstrate high performance similar to that of artificial nuclei made of the process cheese and the cheese-like substance provided that the natural cheese meets the above-described component ratio.

The above-described artificial nucleus made of the agar gel, cheese, or cheese-like substance can be provided with preservation stability by various means so as to be protected from corrosion, degraded quality, hardening due to drying, or the like until the artificial nucleus is used. For example, as described above, a preservative can be added during production. Furthermore, the produced artificial nucleus can be vacuum-packed in a plastic case. Moreover, a deoxidant such as Ageless (registered trade mark) can also be sealed in the plastic case.

I-2. Artificial Cortex 20

The inventor examined the artificial cortex 20 combined with the above-described artificial nucleus 10 and corresponding to the human eye lens cortex.

To allow surgery simulation to be carried out as in the case of the human eyes lens, the artificial cortex needs to meet the following. The artificial cortex is soft enough to allow an instrument for the CCC to be buried in the cortex, is prevented from splashing into a flow of water during hydrodissection, can hold the artificial nucleus in the center of the cortex during the emulsification and aspiration of the nucleus, and can be aspirated by the surgery device.

(1) Artificial Cortex Made of an Agar Gel

As a material for the artificial cortex, the inventor tried the following materials and various combinations thereof: agar, kappa-carrageenan, LM pectin, gelatin, sodium alginate, methyl cellulose, ethyl cellulose, hydroethyl cellulose, sodium hyaluronate, a high water-absorption resin, starch paste, tapioca starch, millet jelly, uiro, sweet bean jelly, silicon oil, various creams for external application, and various toothpastes. Among these materials, agar demonstrated the highest performance when formed into an artificial cortex.

Artificial cortexes were produced using agar gels with various agar concentrations. At an agar concentration of 0.5 wt % to 1.5 wt %, the artificial cortex produced using the agar gel allows the instrument for the CCC to be buried therein, is prevented from splashing into a flow of water, is soft enough to be aspirated by the surgery device, and can thus demonstrate performance approximate to that of the human eye artificial cortex. The artificial cortex made of the agar gel can be produced by, for example, dispersing powdery agar in water at an agar concentration of 0.5 wt % to 1.5 wt %, stirring the solution under heat for five minutes, then cooling and shaping the resulting agar. During the process of producing the agar gel, for example, titanium powder may be added to the agar to whiten the agar. The present invention is not limited to the titanium powder but any substance that can whiten the agar may be added unless the above-described nature of the artificial cortex, corresponding to the object of the present invention, is impaired. As a result, an artificial cortex that is more approximate to the human eye cortex in appearance is obtained. Furthermore, as is the case with the artificial nucleus made of the agar gel, various materials may be added to the artificial cortex made of the agar gel during the steps of preparing an agar solution in order to provide the artificial cortex with preservation stability. For example, addition of sugar, glucose, or millet jelly enables a reduction in free water in the agar gel to inhibit drying of the agar gel and proliferation of microorganisms. Alternatively, a preservative may be used. As a preservative, for example, about 0.1 wt % to 0.5 wt % of methyl parahydroxybenzoate may be used, but the preset invention is not limited to this.

(2) Combination of the Artificial Nucleus 10 and the Artificial Cortex Made of the Agar Gel Then, the inventor examined a combination of the artificial cortex made of the agar gel and the above-described artificial nucleus according to the present invention (the artificial nucleus made of the agar gel and the artificial nucleus made of the cheese or the cheese-like material).

(2)-1. Combination of the Artificial Nucleus Made of the Agar Gel and the Artificial Cortex Made of the Agar Gel As described above, surgical performance approximate to that of the soft human eye lens nucleus or lens cortex was demonstrated by an agar gel of agar concentration 1 wt % to 5 wt %, preferably 1 wt % to 3 wt %, and more preferably 1 wt % to 2 wt % serving as the material of the artificial nucleus 10, or an agar gel of agar connection 0.5 wt % to 1.5 wt % serving as the material of the artificial cortex 20, respectively. Combinations of these artificial nuclei and artificial cortexes were examined.

An artificial nucleus according to the present invention is arranged so as to be coated with an artificial cortex. More preferably, the artificial nucleus is positioned in a central portion of the artificial cortex. A two-layer structure of the artificial nucleus and the artificial cortex can be formed by immersing the artificial nucleus made of an agar gel into an agar solution to be formed into the artificial cortex, and cooling the artificial nucleus and the artificial cortex to a temperature at which the agar solution is gelled. However, at this time, the artificial nucleus and the artificial cortex may adhere together.

The inventor's examinations indicated that this adhesion may be caused by re-dissolution of the surface of the artificial nucleus made of the agar gel due to the temperature of the agar solution to be formed into the artificial cortex, leading to an unclear interface between the artificial nucleus and the artificial cortex. In the cataract surgery practice, the adhesion precludes procedures such as the nuclear splitting and the hydrodissection from being carried out as in the case of the human eyes. Thus, to prevent this problem, a two-layer structure of an artificial nucleus and an artificial cortex was produced as follows. An artificial nucleus was produced and cooled to 0° C. to 10° C. The cooled artificial nucleus was immersed in an agar solution to be formed into an artificial cortex the temperature of which had been adjusted to about 35° C. to 60° C. Then, the artificial nucleus and the artificial cortex were cooled to the temperature at which the agar gel is gelled. This manufacturing method according to the present invention successfully prevented the surface of the artificial nucleus from being re-dissolved, thus avoiding the above-described adhesion.

The inventor further examined the relationship between the agar concentration of the artificial nucleus and the agar concentration of the artificial cortex. Then, when the concentration of the agar gel of the artificial nucleus was higher than that of the agar gel of the artificial cortex, the artificial cortex successfully held the artificial nucleus at a predetermined position, preferably in a central portion of the cortex during the step of emulsifying and aspirating the artificial nucleus. Thus, the artificial lens as a whole demonstrated surgical performance approximate to that of the human eye lens.

(2)-2. Combination of the Artificial Nucleus Made of the Cheese or the Cheese-like Substance with the Artificial Cortex Made of the Agar Gel As described above, the artificial nucleus made of the cheese or the cheese-like substance demonstrates performance approximate to that of the human eye lens nucleus in connection with the splitting step, the emulsifying and aspirating step, and other steps. Around this artificial nucleus, the artificial cortex made of the agar gel of agar concentration 0.5 wt % to 1.5 wt % which demonstrated high performance in combination with the above-described artificial nucleus made of the agar gel was provided. The resulting artificial lens was evaluated for quality.

Immediately after production, the artificial lens demonstrated performance approximate to that of the human eye lens in connection with the cataract surgery. However, the moisture in the agar gel migrated to the cheese or the cheese-like substance, which were then softened and modified in several hours. Hence, this artificial lens is not preferable. Thus, various attempts were made in order to prevent the quality of the artificial nucleus made of the cheese or the cheese-like substance from being degraded as a result of the migration of the moisture from the artificial cortex made of the agar gel.

First, an attempt was made to prevent the migration of the moisture from the artificial cortex made of the agar gel and provided on the artificial nucleus made of the cheese or the cheese-like substance by coating the surface of the artificial nucleus with an acrylic resin, varnish, wax, silicon, a car water repellent, or a combination thereof. Then, the artificial nucleus made of the cheese or the cheese-like substance was not successfully coated with the varnish, the silicon, and the car water repellent. Furthermore, the artificial nucleus made of the cheese or the cheese-like substance was successfully coated with the wax and the acrylic resin, which served as thin layers. However, the wax layer and the acrylic resin layer are not aspirated or removed by the ultrasonic surgery device in spite of the small thicknesses thereof. Thus, this structure does not allow human eye surgery to be appropriately simulated.

(3) Artificial Cortex Made of Pulp Fiber

Thus, the inventor considered that the artificial cortex may be formed of a material containing no or little moisture in order to stably maintain the quality of the artificial lens when the artificial lens is stored for a long time and if the artificial nucleus made of the cheese or the cheese-like substance is used as a component of the artificial lens.

An artificial cortex was produced using pup fiber as such a material. The pulp fiber may be, for example, wood pulp (including mechanical pulp and chemical pulp from softwood trees and hardwood trees) or used paper pulp. In particular, pulp such as hardwood tree pulp which has a short fiber length is preferably used. By way of example, commercially available copy paper was placed into water mixed with sodium hydroxide while being crumbled into pulp fiber. The pulp fiber was re-shaped into a sheet forming a rough network. The sheet-like pulp fiber was dried. The sheet-like pulp fiber in a dry state has a moisture content of less than 10 wt %, preferably about 7 wt % or less, and more preferably about 6 wt % or less, though the value depends on an ambient environment. The thickness and basis weight of the sheet-like pulp fiber were set to 400 μm to 600 μm and 40 g/m$^2$ to 90 g/m$^2$, respectively. An artificial cortex was formed by wrapping the sheet-like pulp fiber around an artificial nucleus. One cut end of a substance containing the pulp fiber as a main component can be bonded to the other cut end or the artificial nucleus using, for example, starch paste. Thus, an artificial lens was produced which had a two-layer structure of the artificial nucleus made of the cheese or the cheese-like substance and the artificial cortex made of the pulp fiber.

When exposed to water during surgery simulation, the pulp fiber according to the present invention instantaneously takes water to convert into a substance with a resilience and a softness approximate to those of the human eye cortex. A combination of the artificial cortex made of the pulp fiber and having such nature and the artificial nucleus made of the cheese or the cheese-like substance enabled surgery simulation relatively similar to the surgery of the human eye lens. Furthermore, artificial lenses with stable quality were successfully obtained which had various hardnesses, that is, the nuclei of the artificial lenses had a medium to high hardness.

The combinations of the materials of the artificial nucleus 10 and the artificial cortex 20 which can be used for the present invention have been described.

That is, with reference to FIG. 1, in the artificial lens 100 according to the first embodiment of the present invention, the artificial nucleus 10 is made of the agar gel of agar concentration 1 wt % to 5 wt %, preferably 1 wt % to 3 wt %, and more preferably 1 wt % to 2 wt %. The artificial nucleus 10 made of the agar gel is coated with the artificial cortex 20 made of the agar gel of agar concentration 0.5 wt % to 1.5 wt %, which is lower than the concentration of the artificial nucleus 10. The artificial nucleus 10 is preferably located in the central portion of the artificial cortex 20. The first embodiment provides an artificial lens with a soft artificial nucleus exhibiting a grade 1 to 2 nucleus hardness according to the Emery classification of the nucleus hardness.

Also with reference to FIG. 1, in the artificial lens 100 according to the second embodiment of the present invention, the artificial nucleus 10 is the cheese or the cheese-like substance. The cheese may be natural or processed, but if the artificial nucleus 10 is not used immediately after the formation of the artificial nucleus 10, the process cheese rather than the natural cheese is preferably used in view of the quality stability thereof. The artificial nucleus 10 made of the cheese or the cheese-like substance is coated with the artificial cortex 20 made of the pulp fiber. The artificial nucleus 10 is preferably located in the central portion of the artificial cortex 20. The second embodiment provides an artificial lens with an artificial nucleus having a medium hardness to a high hardness, that is, exhibiting a grade 2 to 4 nucleus hardness according to the Emery classification of the nucleus hardness.

The artificial lenses 100 according to the above-described two embodiments of the present invention can provide an artificial lens that allows the series of steps of the cataract surgery to be carried out exactly in the same manner as that for the human eyes; the series of steps include the step of grooving and splitting the nucleus, the emulsifying and aspirating step, and the step of aspirating and removing the artificial cortex.

The artificial lenses 100 obtained by the above-described combinations can be provided with preservation stability by various means so as to be stably preserved until the artificial lenses are used. For example, a preservative can be added during production. Furthermore, the produced artificial lenses 100 can be vacuum-packed in a plastic case. Moreover, a deoxidant such as Ageless (registered trade mark) can also be sealed in the plastic case.

1-3. Artificial Lens Capsule

An artificial lens according to another embodiment of the present invention corresponds to the artificial lens 100 according to the first embodiment or the second embodiment which further includes an artificial lens capsule corresponding to the human eye lens capsule. According to the present invention, the artificial lens capsule is a film forming the outermost layer of the artificial lens and is formed of an artificial anterior capsule positioned at a front surface of the artificial lens and an artificial posterior capsule positioned at a rear surface of the artificial lens. In order to allow surgery simulation to be carried out in a manner similar to that for the human eye lens, the artificial anterior capsule and the artificial posterior capsule need to have a thickness and a tear strength or a softness approximate to those of the human eye lens capsule. Furthermore, the artificial posterior capsule preferably has a shape approximate to that of the human eye posterior lens capsule. The artificial nucleus 10 and the artificial cortex 20 are accommodated between the artificial posterior capsule and the artificial anterior capsule. The artificial posterior capsule and the artificial anterior capsule, between which the artificial nucleus 10 and the artificial cortex 20 are arranged, are preferably joined together across 360° preferably to prevent the artificial anterior capsule from being loosened and more preferably to keep the artificial anterior capsule in contact with the artificial cortex 20.

Figure 2:
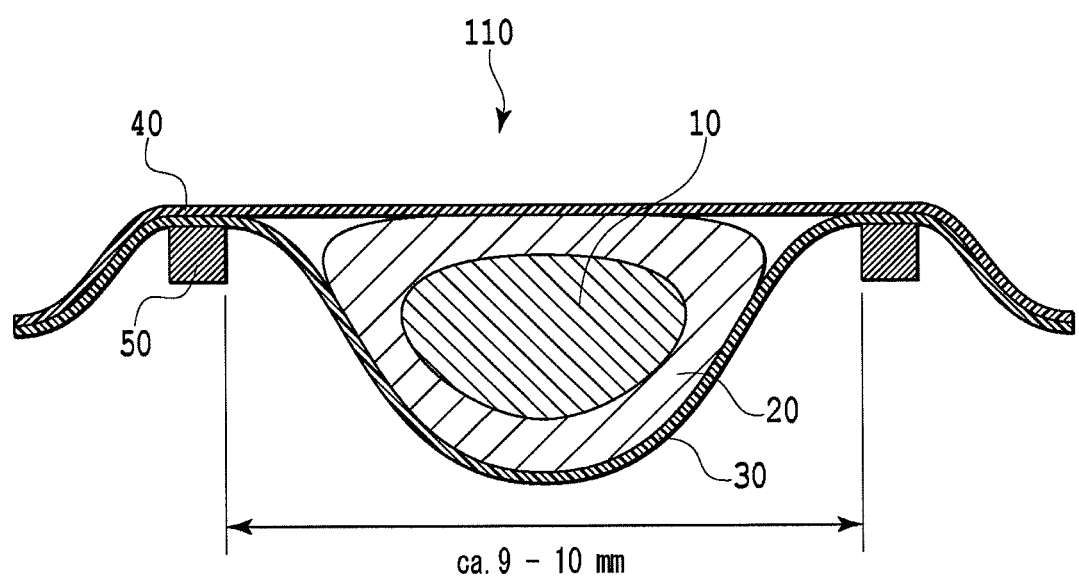
FIG. 2 is a cross-sectional view showing an artificial lens according to a third embodiment of the present invention.
Figure 3:
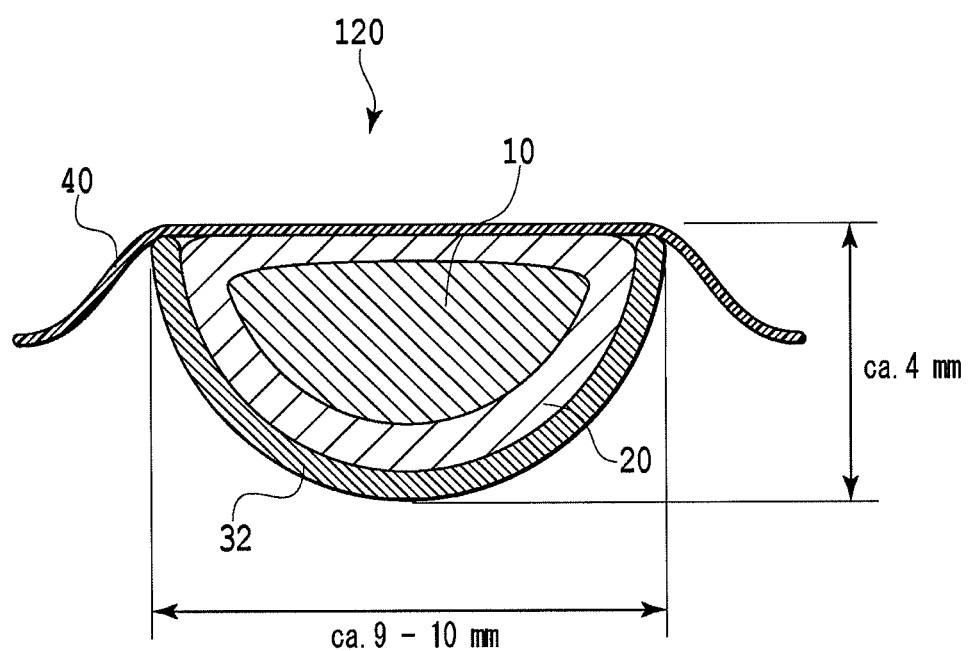
FIG. 3 is a cross-sectional view showing an artificial lens according to a fourth embodiment of the present invention.

With reference to FIG. 2 and FIG. 3, artificial lenses according to a third embodiment and a fourth embodiment of the present invention will be described. FIG. 2 shows a cross-sectional view of an artificial lens 110 according to the third embodiment of the present invention. In the artificial lens 110, both an artificial anterior capsule and a artificial posterior capsule are formed of a film (the artificial anterior capsule made of the film is hereinafter referred to as the "artificial anterior capsule film", and the artificial posterior capsule made of the film is hereinafter referred to as the "artificial posterior capsule film"). Furthermore, FIG. 3 shows a cross-sectional view of an artificial lens 120 according to the fourth embodiment of the present invention. In the artificial lens 120, an artificial anterior capsule is formed of a film as is the case with the third embodiment, whereas an artificial posterior capsule is formed of a cup member with a given shape (the artificial posterior capsule made of the cup member is hereinafter referred to as the "artificial posterior capsule cup member"). The components will be described below. In FIG. 2 and FIG. 3, the size of the artificial lens is shown comparable to that of the human eye lens (shaped like a lens of 9 mm to 10 mm in diameter and about 4 mm in maximum thickness). However, it should be appreciated that the size varies depending on the artificial eye device for cataract surgery practice in which the artificial lens is used.

(1) Artificial Anterior Capsule Film 40

The inventor examined various commonly-produced films to seek a film with nature close to that of the human eye lens capsule. The CCC of the human eyes can be appropriately simulated by using, as the artificial anterior capsule, a film which contains, as a main component, a material selected from a group consisting of polyethylene terephthalate (PET), oriented polypropylene (OPP), cellophane, and agar and which is 4 μm to 45 μm and preferably 4 μm to 20 μm in thickness. In particular, the PET film can demonstrate performance closest to that of the human eye anterior lens capsule of general elderly people.

(2) Artificial Posterior Capsule Film 30

With reference to FIG. 2, the artificial posterior capsule film 30 in the artificial lens 110 according to the third embodiment of the present invention will be described.

The above-described film which can be used for the artificial anterior capsule film 40 can also be used as a material for the artificial posterior capsule; the film contains, as a main component, a material selected from a group consisting of PET, OPP, cellophane, and agar and is 4 μm to 45 μm and preferably 4 μm to 20 μm in thickness. As described above, such a film may have nature (tear strength, resilience, softness, and the like) close to that of the human eye lens capsule. Thus, the use of this artificial posterior capsule film allows intraoperative complications such as posterior capsule rupture and dropping of the nucleus into the vitreous cavity to be experienced during the surgery simulation, helping to achieve more effective learning.

An example of production of the artificial lens 110 will be described. That is, by way of example, an artificial posterior capsule 30 was formed using a PET film of thickness 5 μm. Specifically, the PET film of thickness 5 μm was curved so as to approximate the shape of the human eye posterior lens capsule, thus forming, in the PET film, a recess with a depth of about 4 mm which projected downward. The film was fixed, with an adhesive, to an upper portion of a ring-like structure with an inner diameter of 9 mm to 10 mm which served as a support member. The two-layer structure of the artificial nucleus 10 and the artificial cortex 20 was arranged in the recess. A PET film of thickness 5 μm as the artificial anterior capsule film 40 was placed over the two-layer structure so as to be tightened and was joined to the artificial posterior capsule film 30 across 360°. The junction may be achieved using, for example, a common adhesive for plastics. Thus, the present example used a ring-like support member 50. However, in a variation of the embodiment, any structure other than the ring-like support member 50 may be used to fix the artificial anterior capsule film 40 to the artificial posterior capsule film 30 provided that the structure enables the films to be joined together as described above. In another variation of the embodiment, the artificial anterior capsule film 40 and the artificial posterior capsule film 30 may be joined together like a ring without using the support member or being fixed to the support member. Thus, the artificial lens 110 is obtained in which both the artificial anterior capsule and the artificial posterior capsule are formed of the film.

Due to the above-described configuration, the artificial lens 110 allows all the steps of ultrasonic cataract surgery for artificial cataract lenses with various nuclei from a soft nucleus to a hard nucleus to be carried out so as to cause a feeling very similar to that which is generated in the case of the human eye surgery; the steps include not only the CCC step but also the hydrodissection step, the nuclear splitting procedure based on various techniques, the nucleus emulsifying and aspirating step, and the cortex aspirating step, as well as a step of inserting an intraocular lens. Furthermore, using the particular film for the artificial anterior capsule allows intraoperative complications such as posterior capsule rupture and the subsequent dropping of the nucleus into the vitreous cavity to be simulated. This enables the trainee to learn measures to be taken for the complications.

(3) Artificial Posterior Capsule Cup Member 32

FIG. 3 shows a cross-sectional view of the artificial lens 120 according to the fourth embodiment of the present invention. The artificial lens 120 according to the fourth embodiment of the present invention is configured similarly to the variation of the artificial lens 110 which does not include the support member 50 except that the artificial lens 120 corresponds to the artificial lens 110 according to the third embodiment which uses an artificial posterior capsule cup member 32 instead of the artificial posterior capsule film 30. The artificial posterior capsule cup member 32 according to the present invention is shaped to correspond to the human eye posterior lens capsule. The artificial posterior capsule cup member 32 may be made of, for example, hardened plastics. However, the material of the artificial posterior capsule cup member 32 is not limited provided that the material provides a given shape approximate to that of the human eye posterior lens capsule. A relatively soft material may also be used such as a silicon resin, a fluorine resin, or synthetic rubber. The two-layer structure of the artificial nucleus 10 and the artificial cortex 20 according to the present invention is placed inside the artificial posterior capsule cup member 32. The artificial anterior capsule 40 is placed over the two-layer structure and joined to the artificial posterior capsule cup member 32. The artificial lens is thus completed. Preferably, the artificial anterior capsule 40 is tightened and joined to the periphery of an opening in the artificial posterior capsule cup member preferably across 360°. As described above, the junction may be achieved using, for example, a common adhesive for plastics.

Due to the above-described configuration, the artificial lens 120 allows all the steps of ultrasonic cataract surgery for artificial cataract lenses with various nuclei from a soft nucleus to a hard nucleus to be carried out so as to cause a feeling very similar to that which is generated in the case of the human eye surgery; the steps include not only the CCC step but also the hydrodissection step, the nuclear splitting procedure based on various techniques, the nucleus emulsifying and aspirating step, and the cortex aspirating step, as well as the step of inserting an intraocular lens. The use of the artificial posterior capsule cup member 32 as the artificial posterior capsule fails to allow intraoperative complications such as posterior capsule rupture and the subsequent dropping of the nucleus into the vitreous cavity to be simulated, but advantageously enables the artificial lens 120 to be easily produced, leading to easy mass production.

The artificial lenses 110 and 120 according to the above-described two embodiments of the present invention can provide an artificial lens that allows the series of steps of the cataract surgery to be carried out exactly in the same manner as that for the human eyes; the series of steps include not only the CCC step but also the step of grooving and aspirating the nucleus, the emulsifying and aspirating step, and the step of aspirating and removing the artificial cortex.

The artificial lenses 110 and 120 obtained by the above-described combinations can be provided with preservation stability by various means so as to be more stably preserved until the artificial lenses are used, as is the case with the artificial lens 100. For example, a preservative can be added during production. Furthermore, the produced artificial lenses 110 and 120 can be vacuum-packed in a plastic case. Moreover, a deoxidant such as Ageless (registered trade mark) can also be sealed in the plastic case.

II. Usage of the Artificial Lens According to the Present Invention

II-1. Application to the Artificial Eye Device for Cataract Surgery Practice

The artificial lens according to the present invention is a disposable product that can be replaceably installed in the artificial eye device for cataract surgery practice. With reference to FIG. 4 to FIG. 11B, the usage of the artificial lens according to the present invention will be described taking, as an example, an artificial eye 70 including an upper member 80 partly corresponding to the cornea and iris of the human eye and a lower member 90 partly corresponding to the sclera and posterior capsule of the human eye.

(1) First, the artificial eye 70 will be described.

Figure 4:
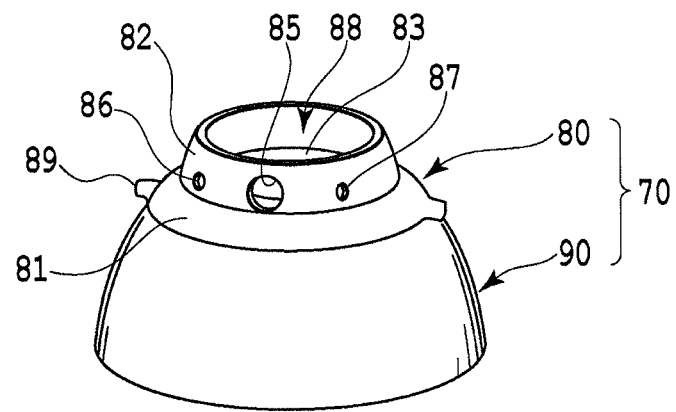
FIG. 4 is a perspective view showing an example of an artificial eye for which the artificial lens according to the present invention can be used.
Figure 5:
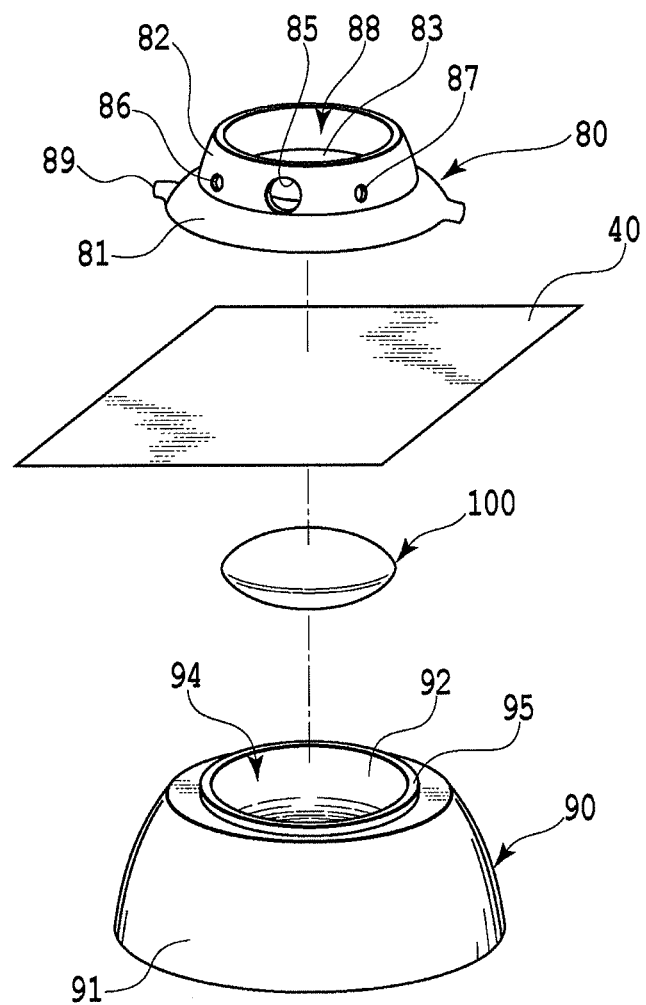
FIG. 5 is an exploded perspective view of an artificial eye using the artificial lens according to the first embodiment of the present invention.
Figure 6:
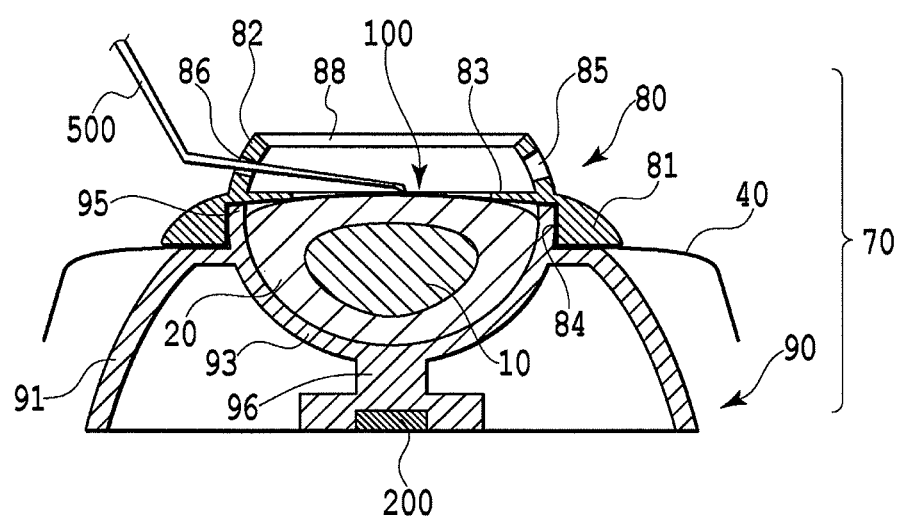
FIG. 6 is a cross-sectional view of the artificial eye using the artificial lens according to the first embodiment of the present invention.

FIG. 4 is a perspective view showing the whole artificial eye to which the artificial lens according to the present invention can be applied. Furthermore, FIG. 5 is an exploded perspective view of the artificial eye 70 (including the applied artificial lens 100 and the separately prepared artificial anterior capsule film 40). FIG. 6 is a cross-sectional view of the artificial eye 70 to which the artificial lens 100 and the separately prepared artificial anterior capsule film 40 have been applied.

The upper member 80 includes a base portion 81 with a protruding curved surface and a flat lower end surface provided in a peripheral portion thereof, a transparent donut-shaped annular portion 82 which is continuous with the base portion 81 and which corresponds to the lower portion of the cornea, a donut-shaped artificial iris portion 83 corresponding to the iris of the human eye, and a circular recessed portion 84 formed under the artificial iris portion 83. In the present example, the annular portion 82 includes a relatively large hole 85 formed therein and in which an ultrasonic handpiece or any other instrument is placed and a first small hole 86 and a second small hole 87 in which an instrument for a anterior lens capsule incising manipulation or an instrument for a nucleus splitting manipulation is placed. Moreover, in the present example, an opening 88 enclosed by the annular portion 82 is formed, and ear portions 89 is formed on the respective opposite sides of the base portion 81.

The lower member 90 includes a substantially semispherical shell-like main body portion 91 with a flat upper end surface and a bottom wall portion 93 forming a recess 92 in which the artificial lens according to the present invention can be accommodated. An upper side of the recess 92 is open; a circuit opening 94 is formed on the upper side of the recess 92. An annular projection 95 projecting from a flat upper end surface is formed around the perimeter of the opening 94.

The outer diameter of the annular projection 95 and the inner diameter of the recessed portion 84 of the upper member 80 are set so that the annular projection 95 and the recessed portion 84 are tightly fitted together via the artificial anterior capsule film 40 to function as tension applying means for applying a uniform tension to the artificial anterior capsule film 40 across 360°. The annular projection 95 need not be completely continuous but may be divided in a circumferential direction provided that the annular projection 95 enables a uniform tension to be applied and is fitted into the recessed portion 84.

Moreover, the lower member 90 may include a support portion 96 formed integrally therewith and hanging from the bottom wall portion 93 toward the center of the sphere. A magnet 200 may be buried in a lower end of the support portion 96 so as to expose a magnetic pole face (see FIG. 6).

According to the present embodiment, a material for the upper member 80 and the lower member 90 is hardened plastic in view of the cost and durability thereof but is not particularly limited. A relatively soft material such as a silicon resin, a fluorine resin, or synthetic rubber may be used. Furthermore, the bottom wall portion 93 forming the recess 92 in the lower member 90 may be a thin film sheet formed of polyester or polypropylene.

(2) Usage

Now, with reference to FIG. 6, an embodiment in which the artificial lens 100 according to the first and second embodiments of the present invention are used in the artificial eye 70 will be described.

FIG. 6 is a cross-sectional view of the artificial eye 70 in which the upper member 80 and the lower member 90 are removably connected together. FIG. 6 shows that a cystotome 500 is being inserted into the first hole 86 or the second hole 87 and that the continuous circular capsulorhexis (CCC) is about to be carried out. An assembly procedure is as follows. First, the artificial lens 100 according to the first or second embodiment of the present invention is placed in the recess 92 in the lower member 90. The separately prepared artificial anterior capsule film 40 is placed over the recess 92 preferably while being brought into abutting contact with the artificial lens 100. Then, the upper member 80 is pressed against the lower member 90 so that the annular projection 95 of the lower member 90 is fitted into the circular recessed portion 84 of the upper member 80. This allows a uniform tension to be applied by an inner surface of the circular recessed portion 84 to the artificial anterior capsule film 40 in abutting contact with the annular projection 95, across 360°. Furthermore, the upper member 80 and the lower member 90 are removably connected together. The artificial anterior capsule film may be the same as the artificial anterior capsule film 40 that can be used for the artificial lenses 110 and 120 according to the third and fourth embodiments of the present invention described above.

The artificial lens according to the present invention applied to the artificial eye device as described above allows the CCC, the hydrodissection, and the splitting and rotation of the nucleus to be practiced through the holes 85, 86, and 87 for instruments, allows nuclear manipulations to be practiced using other instruments, and allows the emulsification and aspiration of the nucleus, the aspiration and removal of the cortex, and the like to be practiced using the ultrasonic surgery device.

Figure 7:
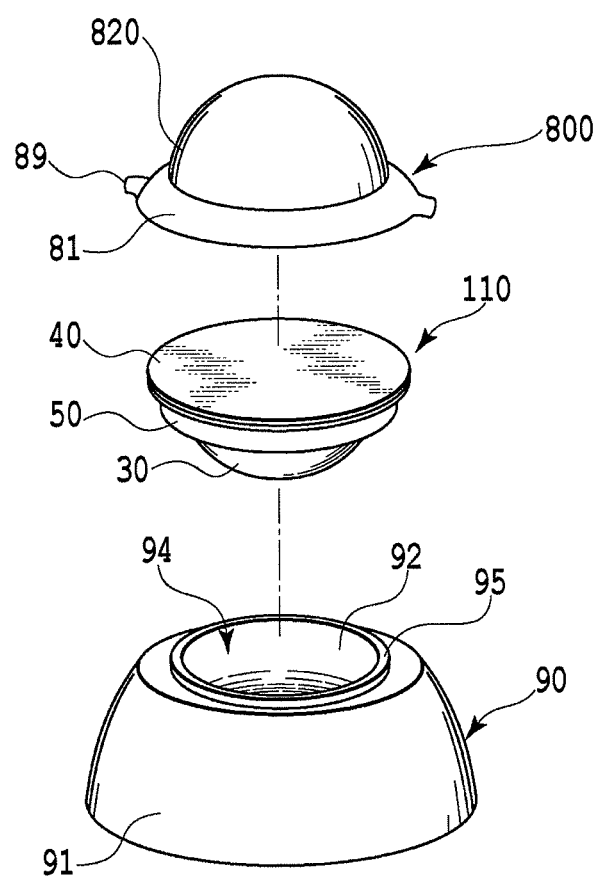
FIG. 7 is an exploded perspective view of an artificial eye using the artificial lens according to the third embodiment of the present invention.
Figure 8:
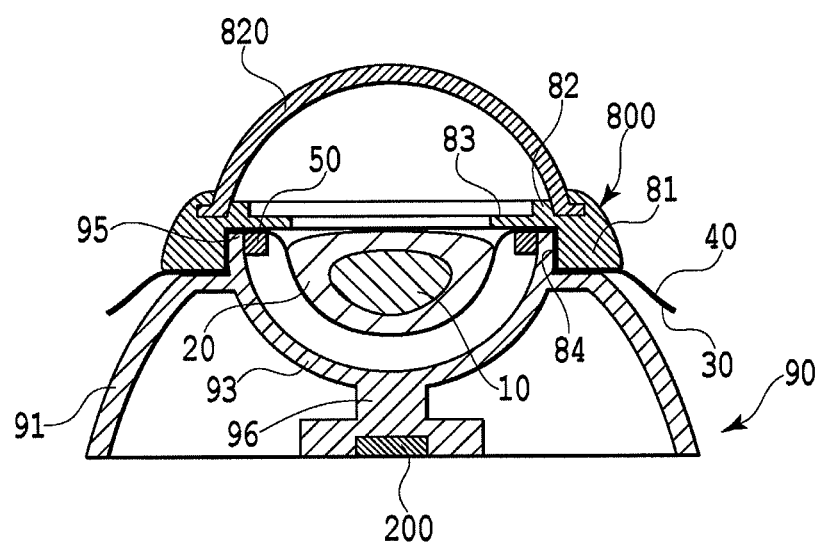
FIG. 8 is a cross-sectional view of the artificial eye using the artificial lens according to the third embodiment of the present invention.

Now, with reference to FIG. 7 and FIG. 8, an example of an embodiment in which the artificial lens 110 and 120 according to the second and third embodiments of the present invention are used in the artificial eye 70 will be described. The artificial lenses 110 and 120 can be similarly used, and thus only the artificial lens 110 will be described. FIG. 7 is an exploded perspective view of the artificial eye 70 (including the applied artificial lens 110). Furthermore, FIG. 8 is a cross-sectional view of the artificial lens 70 to which the artificial lens 110 has been applied.

Unlike the artificial lenses 100 according to the first and second embodiments, the artificial lens 110 according to the third embodiment includes the artificial anterior capsule 40 and can thus be applied to the device for surgery practice without the need to separately prepare the anterior capsule film 40. Specifically, the artificial lens 110 according to the third embodiment of the present invention is placed in the recess 92 in the lower member 90. Then, an upper member 800 is pressed against the lower member 90 so that the annular projection 95 of the lower member 90 is fitted into the circular recessed portion 84 of the upper member 800. This allows a uniform tension to be applied by the inner surface of the circular recessed portion 84 to the artificial anterior capsule film 40 in abutting contact with the annular projection 95, across 360°. Furthermore, the upper member 800 and the lower member 90 are removably connected together.

(3) Variation of the Artificial Eye Device

Here, the upper member 800 in FIG. 7 is a variation of the upper member 80 in FIG. 4 to FIG. 6. The variation allows the following steps to be practiced so as to cause a feeling closer to that which is generated in the case of the human eye surgery: the surgery steps including 1. the continuous circular capsulorhexis (CCC) step, 2. the hydrodissection step of separating the lens capsule from the lens nucleus or the lens cortex, 3. the step of grooving and splitting the lens nucleus into fragments, 4. the step of emulsifying and aspirating the fragments of the lens nucleus, and 5. the step of aspirating the opaque lens cortex, and a step of incising and suturing the cornea which are carried out before or after the surgery steps.

That is, the upper member 800 is the same as the upper member 80 in that the upper member 800 includes the base portion 81 with the protruding curved surface and the flat lower end surface provided in a peripheral portion thereof, the transparent donut-shaped annular portion 82 which is continuous with the base portion 81 and which corresponds to the lower portion of the cornea, the donut-shaped artificial iris portion 83 corresponding to the iris of the human eye, and the circular recessed portion 84 formed under the artificial iris portion 83. However, the upper member 800 is different from the upper member 80 in that the upper member 800 includes a dome-shaped artificial cornea and sclera 820 corresponding to the human eye cornea and sclera. The artificial cornea and sclera 820 can be formed, for example, such that a circular opening in the artificial cornea and sclera 820 is fitted around the annular portion 82. Furthermore, the artificial cornea and sclera 820 may be formed integrally with the base portion 81, annular portion 82, and/or artificial iris portion 83 of the upper member. The artificial cornea and sclera 820 is formed to have a predetermined shape by using a soft material with a resilience and a resistance approximate to those of the human eye cornea and sclera. Such a material may be a soft substance, for example, TPR (ThermoPlastic Rubber), a silicon resin, a soft vinyl chloride resin, a hydro gel, or a soft acrylic resin. The artificial cornea and sclera 820 may be transparent and/or white like the human eye cornea or sclera and may have a transparent portion corresponding to the human eye cornea and a white portion corresponding to the human eye sclera. The artificial cornea and sclera 820 may or may not include a hole for instrument insertion. When the artificial cornea and sclera 820 includes the hole for instrument insertion, the trainee can carry out a practice of inserting an instrument and a device for cataract surgery trough the hole for instrument insertion and learning the appropriate position and manipulation of the instrument and device during operation, in a manner more similar to that for the human eyes. Furthermore, when the artificial cornea and sclera 820 includes no hole for instrument insertion, the artificial cornea and sclera 820, which has a shape and nature approximate to those of the human eye cornea and sclera, allows a practice of incising and suturing the cornea for the cataract surgery to be carried out in a manner very similar to that for the human eye surgery. After the practice, the used artificial cornea and sclera 820 is disposed of, and a new artificial cornea and sclera 80 is installed. Then, the practice can be repeated.

Furthermore, although not shown in the drawings, in another variation of the upper member 80, instead of the artificial cornea and sclera 820, an artificial cornea and sclera may further be provided which is stuck at least to the annular portion of the upper member 80 and which is formed of a soft and planar material having a predetermined thickness and a resilience and a resistance approximate to those of the human eye cornea or sclera. This allows the step of incising and suturing the cornea or the sclera in the cataract surgery to be easily and inexpensively practiced using an artificial sclera or an artificial cornea formed of a planar (sheet-like or tape-like) material.

Moreover, FIG. 9A to FIG. 11B show an embodiment in which an oculomotor device 2000 and restoring force applying means are added to the above-described artificial eye 70. The oculomotor device 2000 and restoring force applying means allow surgery simulation to be carried out in a manner more approximate to that for the human eyes, using the artificial lens according to the present invention.

Figure 9A:
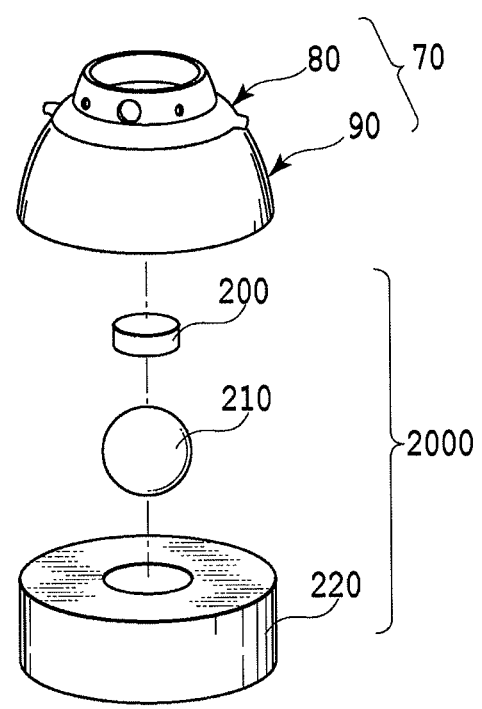
FIG. 9A is an exploded perspective view showing an example of an artificial eye further including an oculomotor device.

The present embodiment will be described with reference to FIG. 9A to FIG. 9C. The present embodiment corresponds to the artificial eye 70 to which an oculomotor device 2000 is added. FIG. 9A is an exploded perspective view of the embodiment including the additional oculomotor device 2000. The oculomotor device 2000 is formed of the magnet 200 incorporated in the artificial eye 70, an iron ball 210 serving as a magnetic substance, and a pedestal 220. The magnet 200 is fixed to the lower member 90 of the artificial eye 70 as described above. An upper portion of the iron ball 210 is exposed, whereas a lower portion of the iron ball 210 is buried and fixed in the pedestal 220.

To allow the eyeball to rotate with a radius of rotation similar to that in the human eyes, the artificial eye 70 as shown in FIG. 9A is desirably shaped like a hemisphere corresponding to the front half of the eyeball. However, the artificial eye 70 maybe a sphere like the human eye. The sizes and shapes of the magnet 200 and the pedestal 220 are not particularly limited. The magnetic substance need not be a perfect sphere but may include a smooth protruding curved surface that comes into contact with the magnet 200. However, the magnetic substance is preferably a sphere in view of the easiness to manufacture the spherical magnetic substance.

The range of rotation of the artificial eye 70 is impacted by the shapes of the pedestal 220 and the artificial eye 70 and the manner of mounting the magnet 200. However, the range of rotation of the artificial eye 70 is most affected by the size of the iron ball 210 and the rate of exposure of the iron ball 210 from the pedestal 220. The range of movement of the artificial eye 70 increases consistently with the radius of the iron ball and the rate of exposure of the iron ball from the pedestal. The size of the iron ball and the rate of the exposure are automatically determined by the range of movement and the radius of rotation similar to those of the human eyes which are to be achieved.

Figure 9B:
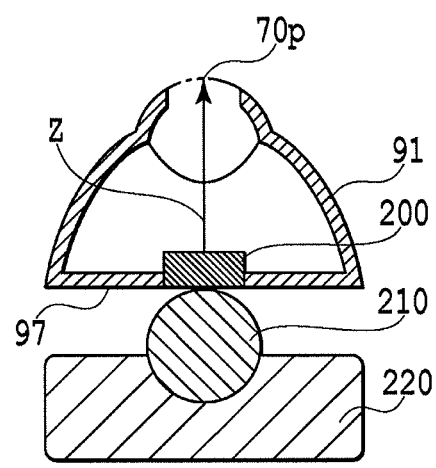
FIG. 9B is a cross-sectional view showing the example of the artificial eye further including the oculomotor device.
Figure 9C:
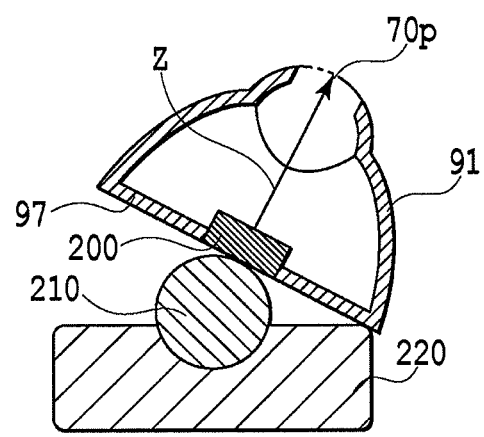
FIG. 9C is another cross-sectional view showing the example of the artificial eye further including the oculomotor device.

FIG. 9B and FIG. 9C are cross-sectional views showing that the magnet 200 fixed to the artificial eye 70 and the iron ball 210 fixed in the pedestal 220 are magnetically attracted to each other. In the artificial eye 70 according to this embodiment, a lower surface of the hemispherical shell-like main body portion 91 of the lower member 90 is closed by a bottom wall 97. The magnet 200 is fixed to the center of the bottom wall 97 of the artificial eye 70. The magnet 200 is installed in the bottom wall 97 so that the direction Z of a line of magnetic force substantially aligns with the direction of a line of sight, in other words, the direction Z lines toward a virtual cornea vertex 70p. Since the direction Z of the line of magnetic force always lies toward the center of the iron ball 210, when an external force is applied to the artificial eye 70, the artificial eye 70 moves so as to slide over a surface of the spherical iron surface 210, while rotating around the center of the iron ball 210. When the external force is eliminated, the artificial eye 70 is held at the current position. Thus, the artificial eye 70 can be fixed in a predetermined direction. Furthermore, when the pedestal 220 is fixed, the artificial eye 70 can be removed from the pedestal 70 by pulling the artificial eye in the direction of the line of magnetic force by an external force stronger than the magnetic force to.

Figure 10A:
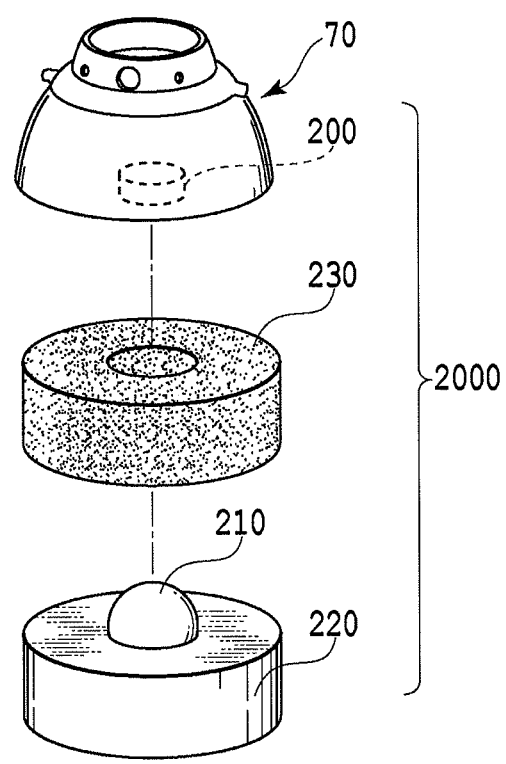
FIG. 10A is an exploded perspective view showing an example of an artificial eye further including restoring force applying means.

Another embodiment of the artificial eye 70 will be described with reference to FIG. 10A to FIG. 10C. This embodiment corresponds to the oculomotor device 2000 in the above-described embodiment to which an resilient member 230 serving as restoring force applying means is added. FIG. 10A is an exploded perspective view of an artificial eye device including the oculomotor device 2000 with the resilient member 230 added thereto. The resilient member 230 is cylindrical and is compressed between the lower member 30 and the pedestal 200 so as to enclose the iron ball 210. The resilient member 230 is formed of a sponge-like substance which is deformed by an applied external force and which is restored when the external force is eliminated. The material, shape, and thickness of the sponge-like substance are not particularly limited but are adjusted so that the trainee has a sense of resistance similar to that which is generated if the eyeball is rotated during the human eye surgery. The material formed of the sponge-like substance is preferably urethane foam but may be a spongy material such as melamine foam or a fibrous bristle material such as polyester or cotton.

Figure 10B:
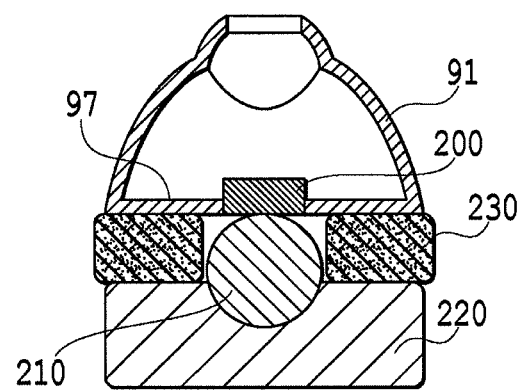
FIG. 10B is a cross-sectional view showing the example of the artificial eye further including the restoring force applying means.
Figure 10C:
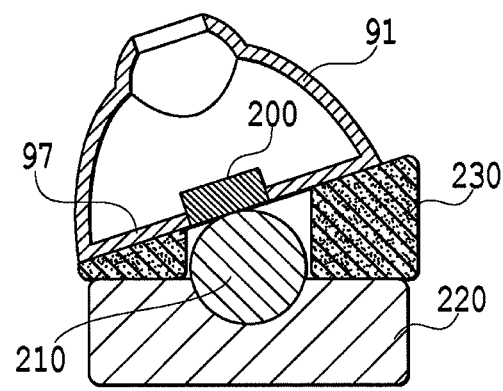
FIG. 10C is another cross-sectional view showing the example of the artificial eye further including the restoring force applying means.

FIG. 10B is a cross-sectional view of the artificial eye device in a normal state in which no external force is applied to the device. In contrast, FIG. 10C is a cross-sectional view showing that an external force has been applied to the device to rotate the artificial eye 70. In this state, when the external force is eliminated, the restoring force of the resilient member 230 restored the artificial eye 70 to the state shown in FIG. 10B. When the artificial eye 70 is rotated by the external force, there is a sense of resistance similar to that which is generated when the human eye is rotated by the restoring force of the resilient member 230. Furthermore, when the force is eliminated, the artificial eye 70 restores to its original state as in the clinical case. This allows more real surgery simulation to be achieved.

Figure 11A:
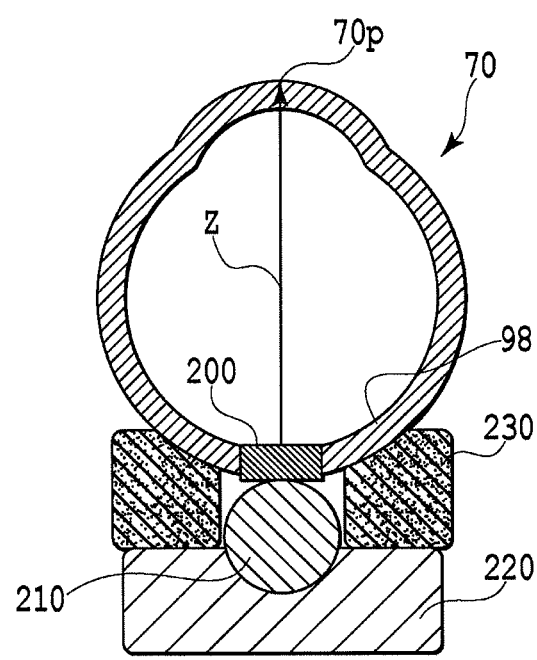
FIG. 11A is a cross-sectional view showing another example of an artificial eye for which the artificial lens according to the present invention can be used.
Figure 11B:
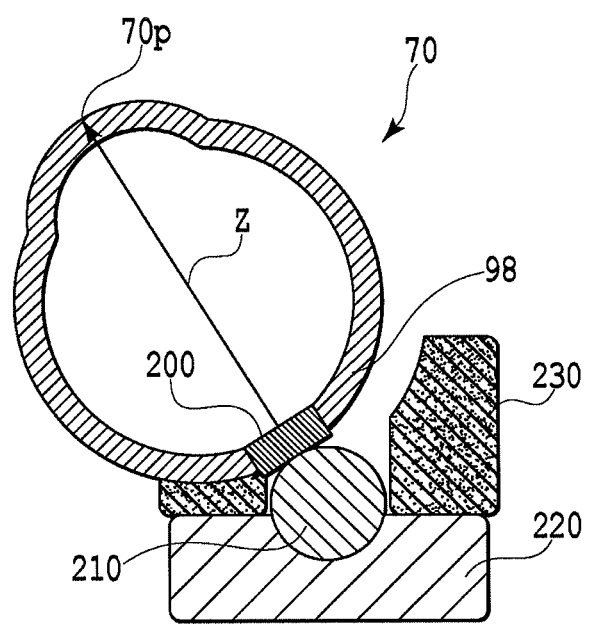
FIG. 11B is a cross-sectional view showing another example of an artificial eye for which the artificial lens according to the present invention can be used.

FIG. 11A and FIG. 11B show an embodiment in which the artificial eye 70 is not a sphere but a hemisphere. FIG. 11A is a cross-sectional view showing the normal state. FIG. 11B is a cross-sectional view showing a state after rotation. In this case, effects similar to those of the hemispherical artificial eye 70 are exerted by installing the magnet 200 in the bottom wall 98 of the lower member 90 which lies opposite the cornea vertex 70p and which is formed into a spherical surface so that the direction Z of a line of magnetic force passes though the cornea vertex 70p, and installing the cylindrical resilient member 230 between the spherical bottom wall 98 and the pedestal 200 and around the iron ball 210. However, in this case, the spherical artificial eye 70 has a slightly large radius of rotation.

The above-described variations of the artificial device effectively allow the cataract surgery to be carried out in a manner more approximate to that for the human eyes.

II-2. Commercially Available Form

Figure 12:
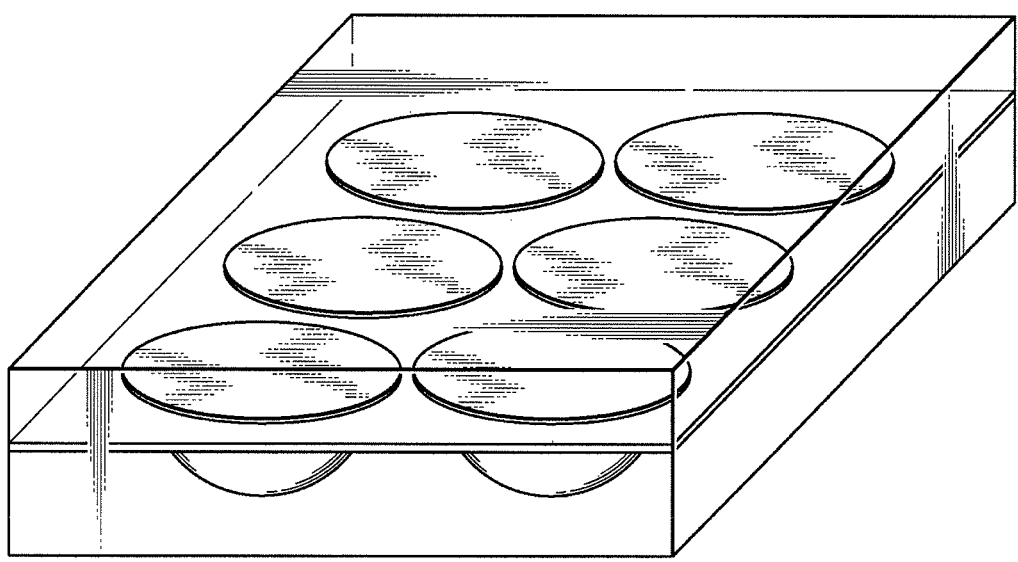
FIG. 12 is a diagram showing an example of an embodiment in which the artificial lens according to the present invention is packaged.

The artificial lens according to the present invention is a disposable product for use in the artificial eye device for cataract surgery practice. FIG. 12 is a schematic diagram showing an example of a commercially available form of the artificial lens according to the preset invention. The artificial lens according to the present invention can be distributed by for example, placing five to six products in a plastic case so as to prevent the artificial lenses from being collapsed during distribution. The artificial lens can be treated so as to be prevented from quality degradation. For example, the artificial lens maybe vacuum-packed or a deoxidant may be sealed in the plastic case.

The artificial lens according to the present invention can be distributed by being pre-incorporated into an artificial eye with an artificial cornea and/or an artificial sclera.

REFERENCE SIGNS LIST

10 Artificial nucleus
20 Artificial cortex
30 Artificial posterior capsule film
32 Artificial posterior capsule cup member
40 Artificial anterior capsule film
50 Support member
70 Artificial eye
80 Upper member
90 Lower member
100, 110, 120 Artificial lenses

The invention claimed is:

1. An artificial lens characterized by comprising:
   an artificial nucleus corresponding to a human eye lens nucleus; and
   an artificial cortex corresponding to a human eye lens cortex, and in that:
   the artificial nucleus is formed of an agar gel of agar concentration 1.0 wt % to 5.0 wt %, and
   the artificial cortex is formed of an agar gel of agar concentration 0.5 wt % to 1.5 wt % which is lower than the agar concentration of an agar gel forming the artificial nucleus.

2. The artificial lens according to claim 1, characterized in that the artificial nucleus is formed of an agar gel of agar concentration 1.0 wt % to 3.0 wt %.

3. The artificial lens according to claim 1, characterized in that the artificial nucleus is formed of an agar of agar concentration 1.0 wt % to 2.0 wt %.

4. The artificial lens according to claim 1, characterized in that the artificial nucleus has a grade 1 to 2 nucleus hardness according to an Emery classification of the nucleus hardness.

5. A method for manufacturing an artificial lens according to claim 1, the method being characterized by comprising:
a step of cooling the artificial nucleus to 0° C. to 10° C.;
a step of preparing an agar solution to be formed into the artificial cortex and adjusting a temperature of the agar solution to 35° C. to 60° C.;
a step of immersing the cooled artificial nucleus in the agar solution; and
a step of cooling the artificial nucleus and the agar solution to a temperature at which the agar solution is gelled.

6. The artificial lens according to claim 1, characterized by further comprising an artificial posterior capsule film having a nature approximate to the nature of a human eye posterior lens capsule; and
an artificial anterior capsule film having a nature approximate to the nature of a human eye anterior lens capsule.

7. The artificial lens according to claim 6, characterized in that:
the artificial anterior capsule film and the artificial posterior capsule film are each formed of, as a main component, a material selected from a group consisting of agar, polyethylene terephthalate, oriented polypropylene, and cellophane, and
the artificial anterior capsule film and the artificial posterior capsule film are 4 µm to 45 µm in thickness.

8. The artificial lens according to claim 6, characterized in that the artificial anterior capsule film contains polyethylene terephthalate as a main component and is 4 µm to 20 µm in thickness.

9. The artificial lens according to claim 6, characterized by further comprising a support member below a junction between the artificial anterior capsule film and the artificial posterior capsule film.

10. The artificial lens according to claim 1, characterized by further comprising an artificial posterior capsule cup member having a nature approximate to the nature of a human eye posterior lens capsule; and
an artificial anterior capsule film having a nature approximate to the nature of a human eye anterior lens capsule.

11. The artificial lens according to claim 10, characterized in that:
the artificial anterior capsule is formed of, as a main component, a material selected from a group consisting of agar, polyethylene terephthalate, oriented polypropylene, and cellophane, and
the artificial anterior capsule film is 4 µm to 45 µm in thickness.

12. The artificial lens according to claim 10, characterized in that the artificial anterior capsule film contains polyethylene terephthalate as a main component and is 4 µm to 20 µm in thickness.

13. An artificial eye device for cataract surgery practice characterized by comprising:
a lower member with a recess that is open on an upper side thereof on which a circular opening is formed;
an upper member removably connected to the lower member and comprising at least an annular portion;
artificial lens according to claim 1 accommodated in the recess;
an artificial anterior capsule film disposed between the lower member and the upper member and formed of a film having a nature approximate to the nature of a human eye anterior lens capsule; and
tension applying means for applying a tension which is uniform across 360° and approximate to a tension applied to the human eye anterior lens capsule, to the artificial anterior capsule film in contact with the artificial lens.

14. The artificial eye device for cataract surgery practice according to claim 13, characterized in that:
the artificial anterior capsule film is formed of, as a main component, a material selected from a group consisting of agar, polyethylene terephthalate, oriented polypropylene, and cellophane, and
the artificial anterior capsule film is 4 µm to 45 µm in thickness.

15. The artificial eye device for cataract surgery practice according to claim 13, characterized in that the artificial anterior capsule film contains polyethylene terephthalate as a main component and is 4 µm to 20 µm in thickness.

16. An artificial eye device for cataract surgery practice characterized by comprising:
a lower member with a recess that is open on an upper side thereof on which a circular opening is formed;
an upper member removably connected to the lower member and comprising at least an annular portion;
the artificial lens according to claim 6 accommodated in the recess; and
tension applying means for applying a tension which is uniform across 360° and approximate to a tension applied to a human eye anterior lens capsule, to the artificial anterior capsule film.

17. The artificial eye device for cataract surgery practice according to claim 13, characterized in that the annular portion of the upper member comprises at least one hole for instrument insertion formed therein.

18. The artificial eye device for cataract surgery practice according to claim 13, characterized by further comprising an artificial cornea or an artificial sclera attached to the annular portion of the upper member and formed of a material having a nature approximate to the nature of a human eye cornea or a human eye sclera.

19. The artificial eye device for cataract surgery practice according to claim 18, characterized in that the artificial cornea or the artificial sclera has a dome shape corresponding to the human eye cornea.

20. The artificial eye device for cataract surgery practice according to claim 18, characterized in that the material having the nature approximate to the nature of the human eye cornea or the human eye sclera is selected from a group consisting of thermoplastic rubber, a silicon resin, a soft vinyl chloride resin, a hydro gel, and a soft acrylic resin.

21. The artificial eye device for cataract surgery practice according to claim 13, characterized by further comprising:
a magnet incorporated in the lower member in such a manner that a direction of a line of magnetic force aligns with a direction of a line of sight; and
a magnetic substance fixed to a pedestal and in which at least a surface that comes into abutting contact with the magnet is formed into a protruding curved surface.

22. The artificial eye device for cataract surgery practice according to claim 16, characterized in that the annular portion of the upper member comprises at least one hole for instrument insertion formed therein.

23. The artificial eye device for cataract surgery practice according to claim 16, characterized by further comprising an artificial cornea or an artificial sclera attached to the annular portion of the upper member and formed of a material having a nature approximate to the nature of a human eye cornea or a human eye sclera.

24. The artificial eye device for cataract surgery practice according to claim 23, characterized in that the artificial cornea or the artificial sclera has a dome shape corresponding to the human eye cornea.

25. The artificial eye device for cataract surgery practice according to claim 23, characterized in that a material with a nature approximate to the nature of the human eye cornea or the human eye sclera is selected from a group consisting of thermoplastic rubber, a silicon resin, a soft vinyl chloride resin, a hydro gel, and a soft acrylic resin.

26. The artificial eye device for cataract surgery practice according to claim 16, characterized by further comprising:
  a magnet incorporated in the lower member in such a manner that a direction of a line of magnetic force aligns with a direction of a line of sight; and
  a magnetic substance fixed to a pedestal and in which at least a surface that comes into abutting contact with the magnet is formed into a protruding curved surface.

27. The artificial eye device for cataract surgery practice according to claim 21, characterized by further comprising restoring force applying means for applying restoring force to the lower member.

28. The artificial eye device for cataract surgery practice according to claim 26, characterized by further comprising restoring force applying means for applying restoring force to the lower member.

* * * * *